US010784991B2

(12) United States Patent
Lin et al.

(10) Patent No.: US 10,784,991 B2
(45) Date of Patent: Sep. 22, 2020

(54) POLAR CODE CONSTRUCTION FOR LOW-LATENCY DECODING AND REDUCED FALSE ALARM RATE WITH MULTIPLE FORMATS

(71) Applicant: QUALCOMM Incorporated, San Diego, CA (US)

(72) Inventors: Jamie Menjay Lin, San Diego, CA (US); Yang Yang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/988,853

(22) Filed: May 24, 2018

(65) Prior Publication Data

US 2018/0351698 A1    Dec. 6, 2018

Related U.S. Application Data

(60) Provisional application No. 62/513,824, filed on Jun. 1, 2017.

(51) Int. Cl.
H03M 13/00 (2006.01)
H04L 1/00 (2006.01)

(52) U.S. Cl.
CPC .......... *H04L 1/0058* (2013.01); *H04L 1/0041* (2013.01); *H04L 1/0045* (2013.01);
(Continued)

(58) Field of Classification Search
CPC ... H04L 1/0045; H04L 1/0061; H04L 1/0058; H04L 1/0067; H04L 1/0041;
(Continued)

(56) References Cited

U.S. PATENT DOCUMENTS 9,042,240 B2 *  5/2015  Luo ................. H04L 1/0038
                                                      370/252
10,420,089 B2 *  9/2019  Nammi ............. H04L 1/1896
(Continued)

OTHER PUBLICATIONS

Huawei., et al., "Summary of Polar Code Design for Control Channels", 3GPP Draft: R1-1700088 Summary of Polar Code Design for Control Channels, 3rd Generation Partnership Project (3GPP), Mobile Competence Centre; 650, Route Des Lucioles: F-06921 Sophia-Ntipolis Cedex, vol. RAN WG1, No. Spokane, USA; Jan. 16, 2017-Jan. 20, 2017, Jan. 16, 2017 (Jan. 16, 2017), XP051207630, 10 pages, Retrieved from the Internet: URL:http://www.3gpp.org/ftp/Meetings_3GPP SYNC/RAN1/Docs/ [retrieved on Jan. 16, 2017].

(Continued)

Primary Examiner — Guerrier Merant
(74) Attorney, Agent, or Firm — Holland & Hart LLP/Qualcomm

(57) ABSTRACT

A transmitter may select a control message format of a set of possible control message formats, each of the possible control message formats corresponding to a different number of information bits. The transmitter may polar encode a payload in the selected control message format to generate and transmit a polar-encoded codeword, the payload having a same number of bits for any of the set of possible control message formats. A receiver may determine the set of possible control message formats for the polar-encoded codeword, and may decode the polar-encoded codeword to identify a candidate control message. The receiver may identify a control message format in the set of possible control message formats for the candidate control message based on multiple hypotheses corresponding to the different number of information bits, and may obtain control information from the candidate control message based on the identified control message format.

31 Claims, 17 Drawing Sheets

(52) U.S. Cl.
CPC .......... *H04L 1/0061* (2013.01); *H04L 1/0067* (2013.01); *H04L 1/0072* (2013.01)

(58) Field of Classification Search
CPC ....... H04L 1/0072; H04L 1/0038; H04L 1/00; H04L 1/0068; H04L 1/0057; H04L 5/006; H04L 1/20; H04L 1/0046; H04L 1/0026; H04W 48/16; H03M 13/635; H03M 13/13
See application file for complete search history.

(56) References Cited

U.S. PATENT DOCUMENTS

| | | | |
|---|---|---|---|
| 2011/0026645 A1* | 2/2011 | Luo ....................... | H04L 1/0038 375/340 |
| 2019/0053201 A1* | 2/2019 | Nammi ................. | H04L 1/0072 |
| 2019/0364548 A1* | 11/2019 | Nammi ................. | H04L 1/1896 |
| 2019/0379484 A1* | 12/2019 | Li ........................ | H03M 13/13 |
| 2019/0386778 A1* | 12/2019 | Chen ........................ | H04L 1/00 |

OTHER PUBLICATIONS

Intel Corporation: "Design Aspects of Polar Code", 3GPP Draft; R1-1708315, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051273508, pp. 1-7, Retrieved from the Internet: URL:http://www.3gpp.org/ftp/Meetings_3GPP_SYNC/RAN1/Docs/ [retrieved on May 14, 2017].
International Search Report and Written Opinion—PCT/US2018/034588—ISA/EPO—dated Aug. 24, 2018.
Nokia., et al., "Considerations on Alternative Ways of Implementing DCI Formats for LTE-Advanced", 3GPP Draft; R1-093318, 3rd Generation Partnership Project (3GPP), Mobile Competence Centre; 650, Route Des Lucioles; F-06921 Sophia-Antipolis Cedex; France, No. Shenzhen, China; Aug. 18, 2009 (Aug. 18, 2009), XP050351641, 3 pages, [retrieved on Aug. 18, 2009].
Panasonic: "DCI format and blind decoding for LTE-Advanced", 3GPP TSG-RAN WG1 Meeting #58bis, 3GPP, R1-093941, Miyazaki, Japan, Oct. 12-16, 2009, pp. 1-5.

* cited by examiner

POLAR CODE CONSTRUCTION FOR LOW-LATENCY DECODING AND REDUCED FALSE ALARM RATE WITH MULTIPLE FORMATS

CROSS REFERENCES

The present Application for Patent claims priority to U.S. Provisional Patent Application No. 62/513,824 by LIN, et al., entitled "Polar Code Construction For Low-Latency Decoding and Reduced False Alarm Rate with Multiple Formats," filed Jun. 1, 2017, assigned to the assignee hereof.

BACKGROUND

The following relates generally to wireless communication, and more specifically to polar code construction for low-latency decoding and reduced false alarm rate with multiple formats.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In LTE systems, a physical downlink shared channel (PDCCH) carries data and signaling information to a UE, including Downlink Control Information (DCI). DCI includes information regarding downlink scheduling assignments, uplink resource grants, transmission scheme, uplink power control, hybrid automatic return repeat request (HARQ) information, modulation and coding schemes (MCS) and other information. A DCI message can be UE-specific (dedicated) or cell-specific (common) and placed in different dedicated and common search spaces within the PDCCH depending on a format of the DCI message. A UE attempts to decode the DCI by performing a process known as a blind decode, during which multiple decode attempts are carried out in the search spaces until the DCI message is detected.

Data transmission often involves sending data over a noisy communication channel. To combat noise, a transmitter may encode code blocks using error correcting codes that introduce redundancy in the code block so that transmission errors may be detected and corrected. Some examples of encoding algorithms with error correcting codes include convolutional codes (CCs), low-density parity-check (LDPC) codes, and polar codes. A polar code is an example of a linear block error correcting code and has been shown to asymptotically approach the theoretical channel capacity as the code length increases. Size ambiguity between different decoding candidates, however, creates challenges for existing implementations.

SUMMARY

The described techniques relate to improved methods, systems, devices, or apparatuses that support polar code construction for low-latency decoding and reduced false alarm rate with multiple formats. Conventional decoding hypothesis techniques for decoding information bit vectors having different bit lengths are deficient for having too high of a false alarm rate or taking too long to decode. The examples described herein provide for an improved false alarm rate, power consumption, and decoding latency.

A transmitter, such as a base station, may select a control message format of a set of possible control message formats, each of the possible control message formats corresponding to a different number of information bits. In an example, the set of possible control message formats may correspond to a set of bit lengths for an information bit vector. The transmitter may polar encode a payload in the selected control message format to generate a polar-encoded codeword, the payload having a same number of bits for any of the set of possible control message formats. In an example, the transmitter may determine a longest bit length of a set of bit lengths for an information bit vector. The transmitter may generate a payload having a bit length that is the same as the longest bit length and includes the information bit vector to be transmitted. If the bit length of the information bit vector is less than the longest bit length, the transmitter may include one or more contingent bits in the payload. The contingent bits may assist a receiver in determining the bit length of the information bit vector from among the multiple possible bit lengths. The transmitter may apply an error detection code (EDC) algorithm to the payload to generate an EDC value, polar encode the payload and the EDC value to generate a polar-encoded codeword having a codeword size of length N, and may transmit the polar-encoded codeword.

A receiver may determine a set of possible control message formats for the polar-encoded codeword, and may decode a signal including the polar-encoded codeword to identify a candidate control message. For example, a receiver, such as a user equipment (UE), may receive a signal for the polar-encoded codeword, generate a sequence of N Log Likelihood Ratios (LLR) values from the received signal, and perform a listing decoding algorithm on the N LLR values to generate a list size L number of paths. The receiver may determine whether a bit sequence corresponding to any of the paths passes error detection. If a bit sequence passes, the receiver may identify the bit sequence as a candidate control message and identify a control message format in the set of possible control message formats for the candidate control message based on multiple hypotheses corresponding to the different number of information bits. For example, the receiver may extract bit values from the bit sequence corresponding to a location of each of the one or more contingent bits. The receiver may use the extracted bit values and the decoding hypotheses to identify a control message format and to select the bit length of the information bit vector from among the multiple possible bit lengths. The receiver may obtain control information from the candidate control message based on the identified control message format. For example, the receiver may then output, process, or otherwise utilize bits of an information vector from the payload corresponding to the selected bit length.

A method of wireless communication is described. The method may include determining a set of possible control message formats for a polar-encoded codeword, each of the set of the possible control message formats having a different bit length, decoding the polar-encoded codeword to identify a decoding candidate bit sequence, determining that a payload portion of the decoding candidate bit sequence corresponding to a longest of the different bit lengths passes an error detection check, identifying a control message of the payload portion corresponding to a control message format in the set of possible control message formats based at least in part on a plurality of hypotheses corresponding to the different bit lengths, and obtaining control information from the control message based at least in part on the control message format.

An apparatus for wireless communication is described. The apparatus may include means for determining a set of possible control message formats for a polar-encoded codeword, each of the set of the possible control message formats having a different bit length, means for decoding the polar-encoded codeword to identify a decoding candidate bit sequence, means for determining that a payload portion of the decoding candidate bit sequence corresponding to a longest of the different bit lengths passes an error detection check, means for identifying a control message of the payload portion corresponding to a control message format in the set of possible control message formats based at least in part on a plurality of hypotheses corresponding to the different bit lengths, and means for obtaining control information from the control message based at least in part on the control message format.

Another apparatus for wireless communication is described. The apparatus may include a processor, memory in electronic communication with the processor, and instructions stored in the memory. The instructions may be operable to cause the processor to determine a set of possible control message formats for a polar-encoded codeword, each of the set of the possible control message formats having a different bit length, decode the polar-encoded codeword to identify a decoding candidate bit sequence, determine that a payload portion of the decoding candidate bit sequence corresponding to a longest of the different bit lengths passes an error detection check, identify a control message of the payload portion corresponding to a control message format in the set of possible control message formats based at least in part on a plurality of hypotheses corresponding to the different bit lengths, and obtain control information from the control message based at least in part on the control message format.

A non-transitory computer-readable medium for wireless communication is described. The non-transitory computer-readable medium may include instructions operable to cause a processor to determine a set of possible control message formats for a polar-encoded codeword, each of the set of the possible control message formats having a different bit length, decode the polar-encoded codeword to identify a decoding candidate bit sequence, determine that a payload portion of the decoding candidate bit sequence corresponding to a longest of the different bit lengths passes an error detection check, identify a control message of the payload portion corresponding to a control message format in the set of possible control message formats based at least in part on a plurality of hypotheses corresponding to the different bit lengths, and obtain control information from the control message based at least in part on the control message format.

In some examples of the method, apparatus, and non-transitory computer-readable medium described above, identifying the control message comprises: determining bit values of at least one contingent bit within the payload portion. Some examples of the method, apparatus, and non-transitory computer-readable medium described above may further include processes, features, means, or instructions for selecting a bit length from the different bit lengths for the control information format based at least in part on the bit values of the at least one contingent bit.

In some examples of the method, apparatus, and non-transitory computer-readable medium described above, the different bit lengths comprise a first bit length corresponding to the longest bit length minus a number of bits of the at least one contingent bit and a second bit length corresponding to the longest bit length.

In some examples of the method, apparatus, and non-transitory computer-readable medium described above, the control message format corresponds to the first bit length based at least in part on the bit values of the at least one contingent bit being zero.

In some examples of the method, apparatus, and non-transitory computer-readable medium described above, the control message format corresponds to the second bit length based at least in part on at least one of the bit values of the at least one contingent bit being non-zero.

In some examples of the method, apparatus, and non-transitory computer-readable medium described above, the different bit lengths comprises a third bit length corresponding to the longest bit length minus a number of bits of a subset of the at least one contingent bit.

In some examples of the method, apparatus, and non-transitory computer-readable medium described above, the control information format corresponds to the third bit length based at least in part on the bit values of the subset of the at least one contingent bit being zero and at least one bit value of the at least one contingent bit being non-zero.

In some examples of the method, apparatus, and non-transitory computer-readable medium described above, a first control information format corresponding to the first bit length may be associated with a first communication type and a second control information format corresponding to the second bit length may be associated with a second communication type.

Some examples of the method, apparatus, and non-transitory computer-readable medium described above may further include processes, features, means, or instructions for determining a channel size as being one of a plurality of channel sizes. Some examples of the method, apparatus, and non-transitory computer-readable medium described above may further include processes, features, means, or instructions for performing de-rate matching on the polar-encoded codeword to generate a de-rate matched codeword, wherein decoding the polar-encoded codeword to identify the decoding candidate bit sequence may be based at least in part on the de-rate matched codeword.

In some examples of the method, apparatus, and non-transitory computer-readable medium described above, the channel size may be a size of a physical broadcast channel.

In some examples of the method, apparatus, and non-transitory computer-readable medium described above, a first channel size of the plurality of channel sizes may be equal to a bandwidth of a synchronization channel, and a second channel size of the plurality of channel sizes may be larger than the bandwidth of the synchronization channel.

In some examples of the method, apparatus, and non-transitory computer-readable medium described above, a first channel size of the plurality of channel sizes may be equal to a bandwidth of a first control channel, and a second channel size of the plurality of channel sizes may be larger than the bandwidth of the first control channel.

In some examples of the method, apparatus, and non-transitory computer-readable medium described above, decoding the polar-encoded codeword to identify the decoding candidate bit sequence comprises: performing a list decoding algorithm to generate a plurality of decoding candidate bit sequences.

In some examples of the method, apparatus, and non-transitory computer-readable medium described above, determining that the payload portion passes the error detection check comprises: extracting a received error check value from the decoding candidate bit sequence. Some examples of the method, apparatus, and non-transitory computer-readable medium described above may further include processes, features, means, or instructions for comparing the received error check value to a calculated representation of the error check value.

A method of wireless communication is described. The method may include identifying control information for transmission to a wireless device, selecting a control message format of a set of possible control message formats for the control information, each of the set of the possible control message formats having a different bit length, generating an error check value based at least in part on a payload comprising the control information, the payload having a longest of the different bit lengths, polar encoding the payload and the error check value to generate a polar-encoded codeword, and transmitting the polar-encoded codeword to the wireless device.

An apparatus for wireless communication is described. The apparatus may include means for identifying control information for transmission to a wireless device, means for selecting a control message format of a set of possible control message formats for the control information, each of the set of the possible control message formats having a different bit length, means for generating an error check value based at least in part on a payload comprising the control information, the payload having a longest of the different bit lengths, means for polarring encoding the payload and the error check value to generate a polar-encoded codeword, and means for transmitting the polar-encoded codeword to the wireless device.

Another apparatus for wireless communication is described. The apparatus may include a processor, memory in electronic communication with the processor, and instructions stored in the memory. The instructions may be operable to cause the processor to identify control information for transmission to a wireless device, select a control message format of a set of possible control message formats for the control information, each of the set of the possible control message formats having a different bit length, generate an error check value based at least in part on a payload comprising the control information, the payload having a longest of the different bit lengths, polar encoding the payload and the error check value to generate a polar-encoded codeword, and transmit the polar-encoded codeword to the wireless device.

A non-transitory computer-readable medium for wireless communication is described. The non-transitory computer-readable medium may include instructions operable to cause a processor to identify control information for transmission to a wireless device, select a control message format of a set of possible control message formats for the control information, each of the set of the possible control message formats having a different bit length, generate an error check value based at least in part on a payload comprising the control information, the payload having a longest of the different bit lengths, polar encoding the payload and the error check value to generate a polar-encoded codeword, and transmit the polar-encoded codeword to the wireless device.

In some examples of the method, apparatus, and non-transitory computer-readable medium described above, generating the error check value comprises: inserting at least one contingent bit to the control information to obtain the payload.

Some examples of the method, apparatus, and non-transitory computer-readable medium described above may further include processes, features, means, or instructions for setting each bit value of the at least one contingent bit to zero.

In some examples of the method, apparatus, and non-transitory computer-readable medium described above, the different bit lengths comprise a first bit length corresponding to a longest bit length minus a number of bits of the at least one contingent bit and a second bit length corresponding to the longest bit length.

In some examples of the method, apparatus, and non-transitory computer-readable medium described above, the different bit lengths comprise a third bit length corresponding to the longest bit length minus a number of bits of a subset of the at least one contingent bit.

In some examples of the method, apparatus, and non-transitory computer-readable medium described above, the control information corresponds to the third bit length, the method further comprising setting each bit value of the subset of the at least one contingent bit to zero and at least one bit value of the at least one contingent bit to non-zero.

In some examples of the method, apparatus, and non-transitory computer-readable medium described above, a first control information format corresponding to the first bit length may be associated with a first communication type and a second control information format corresponding to the second bit length may be associated with a second communication type.

Some examples of the method, apparatus, and non-transitory computer-readable medium described above may further include processes, features, means, or instructions for determining a channel size as being one of a plurality of channel sizes. Some examples of the method, apparatus, and non-transitory computer-readable medium described above may further include processes, features, means, or instructions for performing rate matching on the codeword to generate a rate matched codeword, wherein transmitting the codeword comprises transmitting the rate match codeword.

In some examples of the method, apparatus, and non-transitory computer-readable medium described above, the channel size may be a size of a physical broadcast channel.

In some examples of the method, apparatus, and non-transitory computer-readable medium described above, a first channel size of the plurality of channel sizes may be equal to a bandwidth of a synchronization channel, and a second channel size of the plurality of channel sizes may be larger than the bandwidth of the synchronization channel.

In some examples of the method, apparatus, and non-transitory computer-readable medium described above, a first channel size of the plurality of channel sizes may be equal to a bandwidth of a first control channel, and a second channel size of the plurality of channel sizes may be larger than the bandwidth of the first control channel.

In some examples of the method, apparatus, and non-transitory computer-readable medium described above, the set of possible control message formats comprise all control message formats associated with a size of the polar-encoded codeword.

DETAILED DESCRIPTION

Figure 1:
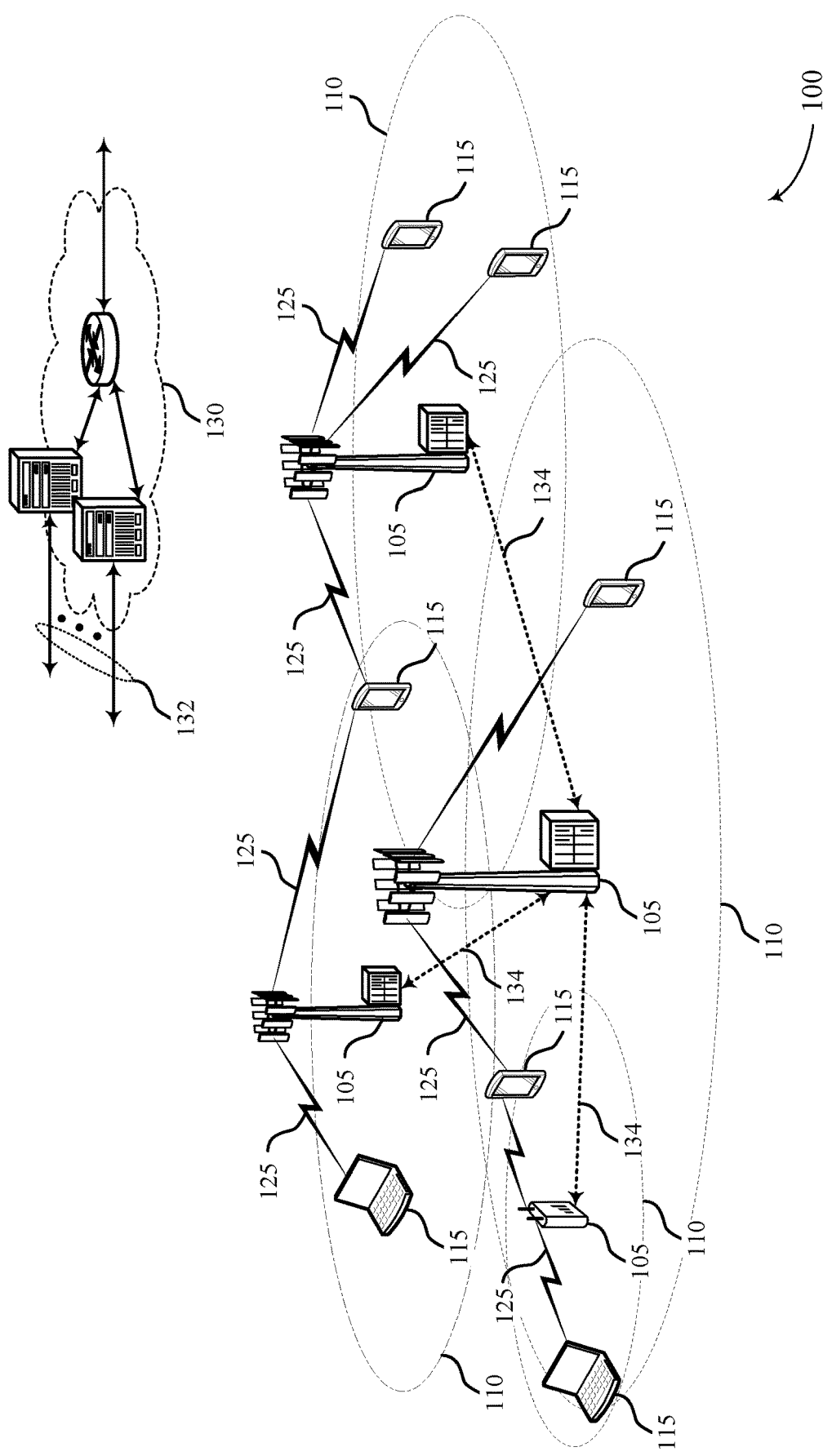
FIG. 1 illustrates an example of a system for wireless communication that supports polar code construction for low-latency decoding and reduced false alarm rate with multiple formats in accordance with aspects of the present disclosure.

The described techniques relate to improved methods, systems, devices, or apparatuses that support polar code construction for low-latency decoding and reduced false alarm rate with multiple formats. Generally, the described techniques provide for improving the ability of a receiver to determine which format of a set of possible control message formats a transmitter used to generate a polar-encoded codeword. The techniques described herein may reduce decoding latency and reduce a false alarm rate.

A polar code may be composed of multiple sub-channels having different levels of reliability. Sub-channel reliability may represent a capacity of the sub-channel to carry information as part of the encoded codeword. Sub-channels of a polar code having higher reliabilities are used to encode information bits and the remaining sub-channels are used to encode frozen bits. For N sub-channels, k information bits may be loaded into the k most reliable sub-channels and N-k frozen bits may be loaded into the N-k least reliable sub-channels, where k<N. A frozen bit is a bit having a known value to a decoder and is generally set as '0'. The value of a frozen bit, however, may be any value as long as the value of the frozen bit is known to the decoder.

A base station may transmit a physical downlink control channel (PDCCH) that carries a Downlink Control Information (DCI) message to a user equipment (UE). The DCI message can be UE-specific (dedicated) or cell-specific (common) and placed in different dedicated and common search spaces within the PDCCH depending on a format of the DCI (e.g., format 1/2/3/4/5). In some cases, a PDCCH may carry DCI messages associated with multiple UEs. Challenges may arise in successfully detecting information intended for a particular UE, while maintaining a low false alarm rate. In conventional systems, a UE is assigned one or more radio network identifiers (e.g., a cell radio network temporary identifier (C-RNTI)) that facilitate DCI detection. A UE attempts to decode the DCI by performing a process known as a blind decode, during which multiple decode attempts are carried out in the search spaces until the DCI is detected (e.g., when a Cyclic Redundancy Check (CRC) masked by one of the radio network identifiers passes for the decoded DCI). The DCI may have one of a fixed number of different lengths, and the UE may attempt to decode the search space based on one or more of the different lengths.

In some examples, the UE may have multiple blind decode hypotheses where each hypothesis corresponds to a particular format for a payload, having a particular payload size, encoded into a codeword. DCI, for example, may include multiple payload formats. Each hypothesis may specify a location and number of information bits and CRC bits within a codeword. The UE may use a decoding hypothesis to determine whether a decoded bit sequence corresponds to particular format and passes a CRC. If the bit sequence passes CRC, the UE determines that it has successfully decoded the codeword and that the bit sequence is in the format specified in the decoding hypothesis. The UE may then output DCI from the bit sequence and process the DCI. If CRC fails, however, the UE determines if CRC passes for a different decoding hypothesis. If all decoding hypotheses fail, the UE declares a decoding error.

Conventional decoding hypothesis techniques are deficient for having too high of a false alarm rate, for taking too long to decode, or both. In Long Term Evolution (LTE), for example, a tail-biting convolutional code (TBCC) may be used to encode DCI to generate a codeword. LTE, for instance, uses a TBCC to encode PDCCH data, and each DCI format for the PDCCH data may have a different length. A bit length of a TBCC codeword is a function of the number of information bits p of the DCI being encoded (e.g., bit length=3*p). Because the number of information bits p is different for each DCI format (e.g., length p, p', p"), the bit length of each TBCC codeword is different.

Decoding codewords of different lengths increases decoder latency and false alarm rate. During decoding, a UE receives a signal that includes the codeword and generates a sequence of log-likelihood ratio (LLR) values that are provided to a decoder. A decoder of the UE uses a first decoding hypothesis corresponding to DCI having a first length p, obtains a sequence of 3*p LLR values from the signal as a codeword, and extracts bits of length p and CRC bits from the sequence based on the decoding hypothesis. The UE calculates a CRC value from the sequence bits, and compares the extracted CRC bits to the calculated CRC value. If the CRC fails, the decoder then performs the same procedure for a next decoding hypothesis for a different payload size p'. Performing the same procedure multiple times is time consuming, results in decoder latency, and increases the false alarm rate. The UE also detrimentally has to calculate a CRC value for each of the different bit lengths p.

Conventional polar coding techniques suffer from similar problems. In 5G new radio (NR) systems, polar codes are used to encode control information bits. Control information has different formats of different bit lengths requiring a UE to run a decoding operation multiple times to generate a bit sequence for each decoding hypothesis. Checking multiple decoding hypotheses of different lengths again creates challenges in decoding latency, power consumption, and false alarm rates. For instance, during decoding of a polar-encoded codeword, a UE receives a signal that includes the polar-encoded codeword and generates a sequence of LLR values that are provided to a decoder. The decoder applies a first decoding hypothesis corresponding to control information having a first length p, and obtains a sequence of N LLR values from the signal as a codeword, where p<N. The UE extracts payload bits of length p and CRC bits from the sequence based on the first decoding hypothesis. The UE calculates a CRC value from the sequence, and compares the extracted CRC bits to the calculated CRC value. If the CRC fails, the decoder then performs the same procedure for a next decoding hypothesis of a different bit length p', where p'<N. As in TBCC, performing the same decoding procedure multiple times for each different decoding hypothesis is time consuming, results in decoder latency, and increasing the false alarm rate. Moreover, these challenges are particularly acute in systems that use ultra-reliable low latency communications (URLLC) services, massive machine type communications (mMTC) services, or both.

The examples described herein provide for improved false alarm rate, power consumption, and decoding latency. In an example, a transmitter, such as a base station, may select a control message format of a set of possible control message formats, each of the possible control message formats corresponding to a different number of information bits. In an example, the set of possible control message formats may correspond to a set of bit lengths for an information bit vector. The transmitter may polar encode a payload in the selected control message format to generate a polar-encoded codeword, the payload having a same number of bits for any of the set of possible control message formats. In an example, the transmitter may determine a longest bit length of a set of bit lengths for an information bit vector. The transmitter may generate a payload having a bit length that is the same as the longest bit length and includes the information bit vector to be transmitted. If the bit length of the information bit vector is less than the longest bit length, the transmitter may include one or more contingent bits in the payload. The contingent bits may assist a receiver in determining the bit length of the information bit vector from among the multiple possible bit lengths. The transmitter may apply an error detection code (EDC) algorithm to the payload to generate an EDC value, polar encode the payload and the EDC value to generate a polar-encoded codeword having a codeword size of length N, and may transmit the polar-encoded codeword.

A receiver may determine a set of possible control message formats for the polar-encoded codeword, and may decode a signal including the polar-encoded codeword to identify a candidate control message. For example, a receiver, such as a UE, may receive a signal for the polar-encoded codeword, generate a sequence of N LLR values from the received signal, and perform a list decoding algorithm on the N LLR values to generate a list size L number of paths. The receiver may determine whether a bit sequence corresponding to any of the paths passes error detection. If a bit sequence passes, the receiver may identify the bit sequence as a candidate control message and identify a control message format in the set of possible control message formats for the candidate control message based on multiple hypotheses corresponding to the different number of information bits. For example, the receiver may extract bit values from the bit sequence corresponding to a location of each of the one or more contingent bits. The receiver may use the extracted bit values and the decoding hypotheses to identify a control message format and to select the bit length of the information bit vector from among the multiple possible bit lengths. The receiver may obtain control information from the candidate control message based on the identified control message format. For example, the receiver may then output, process, or otherwise utilize bits from the payload corresponding to the selected bit length.

Beneficially, the techniques described herein may provide for an improved false alarm rate, power consumption, and decoding latency. The false alarm rate, power consumption, and decoding latency may be reduced due to only having to perform a list decoding algorithm a single time for the multiple decoding hypotheses for the different possible bit lengths of the information vector. Moreover, an EDC value having a same number C of bits may be used to protect the information vector regardless of its bit length, which also improves the false alarm rate, power consumption, and decoding latency. In the conventional decoding method described above, a decoding operating may be performed M times, and thus has a false alarm rate proportional to $M*2^{-C}$. The examples described herein may reduce the false alarm rate by a factor of M since each of the decoding hypotheses may be jointly checked without having to run a list decoding algorithm for each of the different decoding hypotheses.

Aspects of the disclosure are initially described in the context of a wireless communications system. The wireless communication system may polar encode a payload having a common bit length and may have zero or more contingent bits that enables a receiver to determine a format and bit length of an information vector included in the payload. Aspects of the disclosure are further illustrated by and described with reference to apparatus diagrams, system diagrams, and flowcharts that relate to polar code construction for low-latency decoding and reduced false alarm rate with multiple formats.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

The examples described herein provide for an improved false alarm rate, power consumption, and decoding latency for decoding a codeword that is a function of an information vector having one of multiple sizes. A transmitter, such as a base station 105, may select a control message format of a set of possible control message formats, each of the possible control message formats corresponding to a different number of information bits. In an example, the set of possible control message formats may correspond to a set of bit lengths for an information bit vector. The base station 105 may polar encode a payload in the selected control message format to generate a polar-encoded codeword, the payload having a same number of bits for any of the set of possible control message formats. In an example, the base station 105 may determine a longest bit length of a set of bit lengths for an information bit vector. The base station 105 may generate a payload having a bit length that is the same as the longest bit length and includes the information bit vector to be transmitted. If the bit length of the information bit vector is less than the longest bit length, the base station 105 may include one or more contingent bits in the payload. The contingent bits may assist a receiver in determining the bit length of the information bit vector from among the multiple possible bit lengths. The base station 105 may apply an EDC algorithm to the payload to generate an EDC value, polar encode the payload and the EDC value to generate a polar-encoded codeword having a codeword size of length N, and may transmit the polar-encoded codeword.

A receiver may determine a set of possible control message formats for the polar-encoded codeword, and may decode a signal including the polar-encoded codeword to identify a candidate control message. For example, a receiver, such as a UE 115, may receive a signal for the polar-encoded codeword, generate a sequence of N LLR values from the received signal, and perform a list decoding algorithm on the N LLR values to generate a list size L number of paths. The UE 115 may determine whether a bit sequence corresponding to any of the paths passes error detection. If a bit sequence passes, the UE 115 may identify the bit sequence as a candidate control message and identify a control message format in the set of possible control message formats for the candidate control message based on multiple hypotheses corresponding to the different numbers of information bits. For example, the UE 115 may extract bit values from the bit sequence corresponding to a location of each of the one or more contingent bits. The UE 115 may use the extracted bit values and the decoding hypotheses to identify a control message format and to select the bit length of the information bit vector from among the multiple possible bit lengths. The UE 115 may obtain control information from the candidate control message based on the identified control message format. For example, the UE 115 may then output, process, or otherwise utilize bits from the payload corresponding to the selected bit length.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Conventional coding techniques have an unacceptably high false alarm rate, consume too much power, and suffer from decoder latency. The examples described herein may address these and other issues. In an example, a base station 105 of the wireless communication system 100 may polar encode a payload having a common bit length with zero or more contingent bits that enables a UE 115 to determine a bit length of an information vector included in the payload. The techniques described herein may provide for improved decoding enabling the UE 115 to decode a polar-encoded codeword and determine a bit length of multiple lengths for a transmitted information vector.

Figure 2:
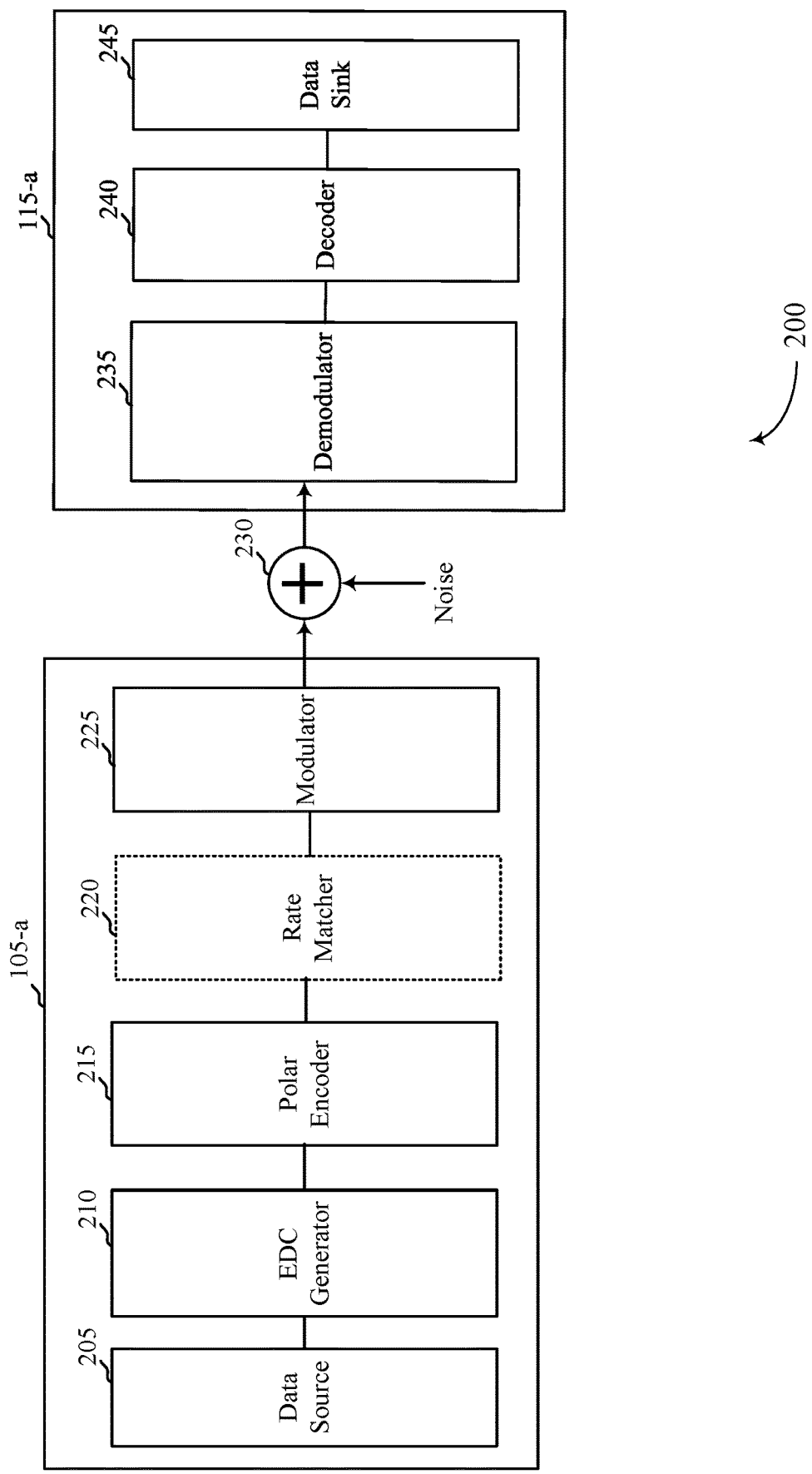
FIG. 2 illustrates an example of a wireless communications system that supports polar code construction for low-latency decoding and reduced false alarm rate with multiple formats in accordance with aspects of the present disclosure.

FIG. 2 illustrates an example of a wireless communication system 200 that supports polar code construction for low-latency decoding and reduced false alarm rate with multiple formats in accordance with various aspects of the present disclosure. In some examples, wireless communication system 200 may implement aspects of wireless communication system 100. Wireless communications system 200 may include a base station 105-a and a UE 115-a. Base station 105-a is an example of base station 105 of FIG. 1, and user equipment 115-a is an example of user equipment 115 of FIG. 1.

Base station 105-a may generate information and polar encode the information into codewords that are transmitted to UE 115-a, to a different base station, or to another device, via a wireless communication channel 230. The information may be a vector having a bit length that is one of multiple different bit lengths. In other examples, user equipment 115-a may generate an information vector and polar encode the information vector for transmission to base station 105-a, another UE, or another device, using these same techniques. In some examples, the information may be control information (e.g., downlink control information (DCI), uplink control information (UCI)). Moreover, devices other than base station 105-a and user equipment 115-a may use the techniques described herein.

In the depicted example, base station 105-a may include a data source 205, an error detection code (EDC) generator 210, a polar encoder 215, a rate matcher 220, and a modulator 225. The data source 205 may provide information (e.g., DCI) to be encoded and transmitted to the UE 115-a. The data source 205 may be coupled to a network, a storage device, or the like. The information may be an information vector that includes a sequence of k information bits, where k is a positive integer. In some examples, a length of the information vector in bits may vary based on a format of the information being transmitted. In an example, DCI may have multiple formats and each format may correspond to a different bit length. For example, a first DCI format may be an information vector that includes a sequence of k information bits, a second DCI format may be an information vector that includes a sequence of k' information bits, and a third DCI format may be an information vector that includes a sequence of k" information bits, where k<k'<k". The base station 105-a may select a format for the information, and corresponding bit length, and the data source 205 may output the information vector of the selected length to the EDC generator 210. For example, the base station 105-a may determine a set of possible control message formats for a polar-encoded codeword, each of the set of the possible control message formats having a different number of information bits.

The EDC generator 210 may apply an error detecting algorithm to the information vector to generate an EDC value. The EDC value may be a sequence of one or more bits to enable the UE 115-*a* to detect an error in transmission of the information vector due to, for example, corruption caused by noise in a wireless communication channel 230. In an example, the EDC algorithm may be a CRC algorithm and the EDC value may be a CRC value. The EDC generator 210 may generate the EDC value to enable a UE 115-*a* to determine which bit length information vector was transmitted. The EDC generator 210 may determine a longest possible bit length of a set of formats for an information bit vector that the base station 105-*a* may transmit. Continuing the above example, the information bit vector may have a bit length k, k', or k", with k" being the longest bit length. Conventionally, a CRC is generated for a bit sequence and is not generated using bits other than in the bit sequence. In the examples described herein, the EDC generator 210 may generate a payload having a same defined number of bits regardless of the bit length of an information bit vector, and may generate the EDC value as a function of the payload. Because information bit vectors having bit lengths k, k' have fewer bits than an information bit vector having bit length k", the EDC generator 210 may insert one or more contingent bits to the shorter information bit vectors to generate a payload having a defined bit length.

Figure 3:
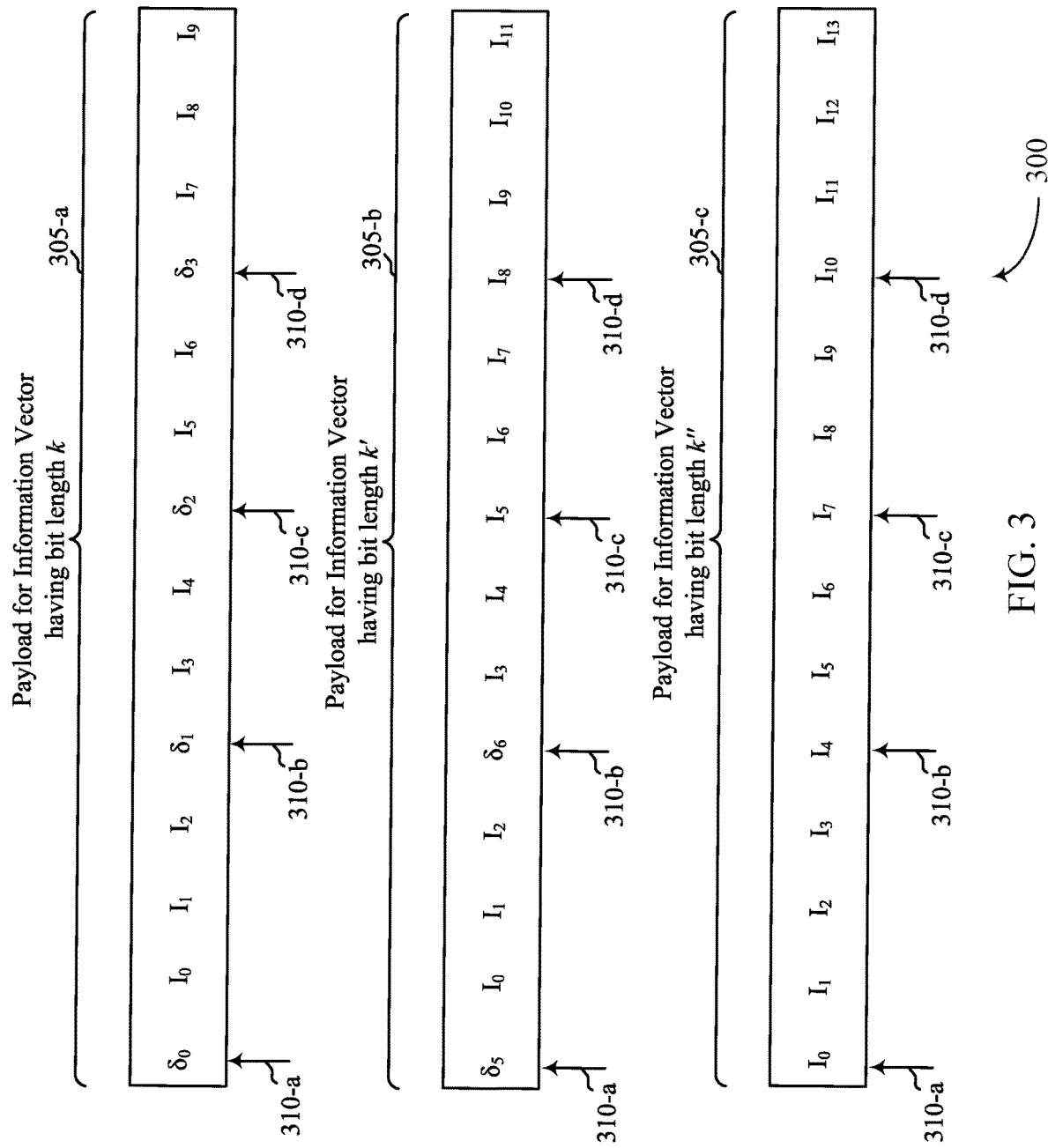
FIG. 3 illustrates an example of payloads having information vectors of different bit lengths that support polar code construction for low-latency decoding and reduced false alarm rate with multiple formats in accordance with aspects of the present disclosure.

FIG. 3 illustrates an example of diagram 300 of payloads that support polar code construction for low-latency decoding and reduced false alarm rate with multiple formats in accordance with various aspects of the present disclosure. In the depicted example are payloads 305-*a*, 305-*b*, and 305-*c*, corresponding to three different formats for three information bit vectors respectively of bit length k, k', and k". The principles described herein may apply to information bit vectors having two or more different bit lengths. Payload 305-*a* includes an information vector having a bit length of 10 information bits (e.g., information vector includes ten information bits $I_0, I_1, \ldots I_9$), payload 305-*b* includes an information vector having a bit length of 12 information bits (e.g., information vector includes twelve information bits $I_0, I_1, \ldots I_{11}$), and payload 305-*c* includes an information vector having a bit length of 14 information bits (e.g., information vector includes fourteen information bits $I_0, I_1, \ldots I_{13}$). In this example, the longest bit length of an information vector is 14 bits.

The EDC generator 210 may insert one or more contingent bits δ at selected locations 310 to the shorter information vectors to generate a payload 305 having a defined bit length that is independent of the bit length of the information vector. The bit locations 310 for the contingent bits δ may be known a priori by both the base station 105-*a* and the UE 115-*a*, and the contingent bits δ may or might not be consecutive bits in the payload 305. For payload 305-*a*, the EDC generator 210 may add four contingent bits $\delta_1, \delta_2, \delta_3$, and $\delta_4$ to the 10-bit information vector to generate a 14-bit payload 305-*a*. For payload 305-*b*, the EDC generator 210 may add two contingent bits $\delta_5$ and $\delta_6$ to the 12-bit information vector to generate a 14-bit payload 305-*b*. For payload 305-*c*, the EDC generator 210 may not add any bits to the 14-bit information vector to generate a payload 305-*c*. The EDC generator 210 may apply an EDC algorithm to the payload 305, which includes an information vector and may include one or more contingent bits, to generate an EDC value.

One or more of the contingent bits may be set to a defined value to enable a UE 115-*a* to distinguish between the different bit lengths of the information vector. For example, a base station 105-*a* may set bit values of each of the one or more contingent bits to zero to signify that the information bit vector has bit length k, may set a first subset of the one or more contingent bits to zero and at least one of a second subset of the one or more contingent bits to non-zero to signify that the information bit vector has bit length k', and may set at least one of the first subset of the one or more contingent bits to non-zero to signify that the information bit vector has bit length k". For example, the base station 105-*a* may set the bit value of contingent bits $\delta_1, \delta_2, \delta_3$, and $\delta_4$ to zero at each of bit locations 310-*a* to 310-*d* in payload 305-*a* to signify that the information bit vector within payload 305-*a* has bit length k. The base station 105-*a* may set the bit value of contingent bits $\delta_5$ and $\delta_6$ to zero at bit locations 310-*a*, 310-*b* in payload 305-*b*, and set to non-zero (e.g., one) at least one of bit locations 310-*c*, 310-*d* in payload 305-*b*, to signify that the information bit vector within payload 305-*a* has bit length k'. The base station 105-*a* may set the bit value to non-zero for at least one of bit locations 310-*a*, 310-*b* in payload 305-*c* to signify that the information bit vector within payload 305-*c* has bit length k". As described later, the UE 115-*a* may use the bit values at locations 310-*a* to 310-*d* to determine a received information vector as having one of the multiple bit lengths. As will be appreciated, the techniques described herein may be used with other values for the contingent bits δ and with the contingent bits δ being at locations other than locations 310 in the payload 305.

In some examples, there may be constraints on values of one or more bits included in the information vector to avoid ambiguity in the bit length of the transmitted information vector. For example, if the base station 105-*a* is permitted to transmit information bits $I_0, I_4, I_7$ and $I_{10}$ all having a bit value of zero in an information vector of length k", a UE 115-*a* may potentially incorrectly determine that the information vector is of length k instead of length k". To avoid this possibility, constraints may be placed on bit values in longer information vectors. As described above, a bit length of an information bit vector may correspond to a particular format for a message (e.g., DCI format, UCI format). The format may include a number of fields and combinations of values of bits within fields at a particular bit locations may be reserved, or selected bit locations may not be used as data bits of the message (e.g., may be reserved or static bits).

Figure 4:
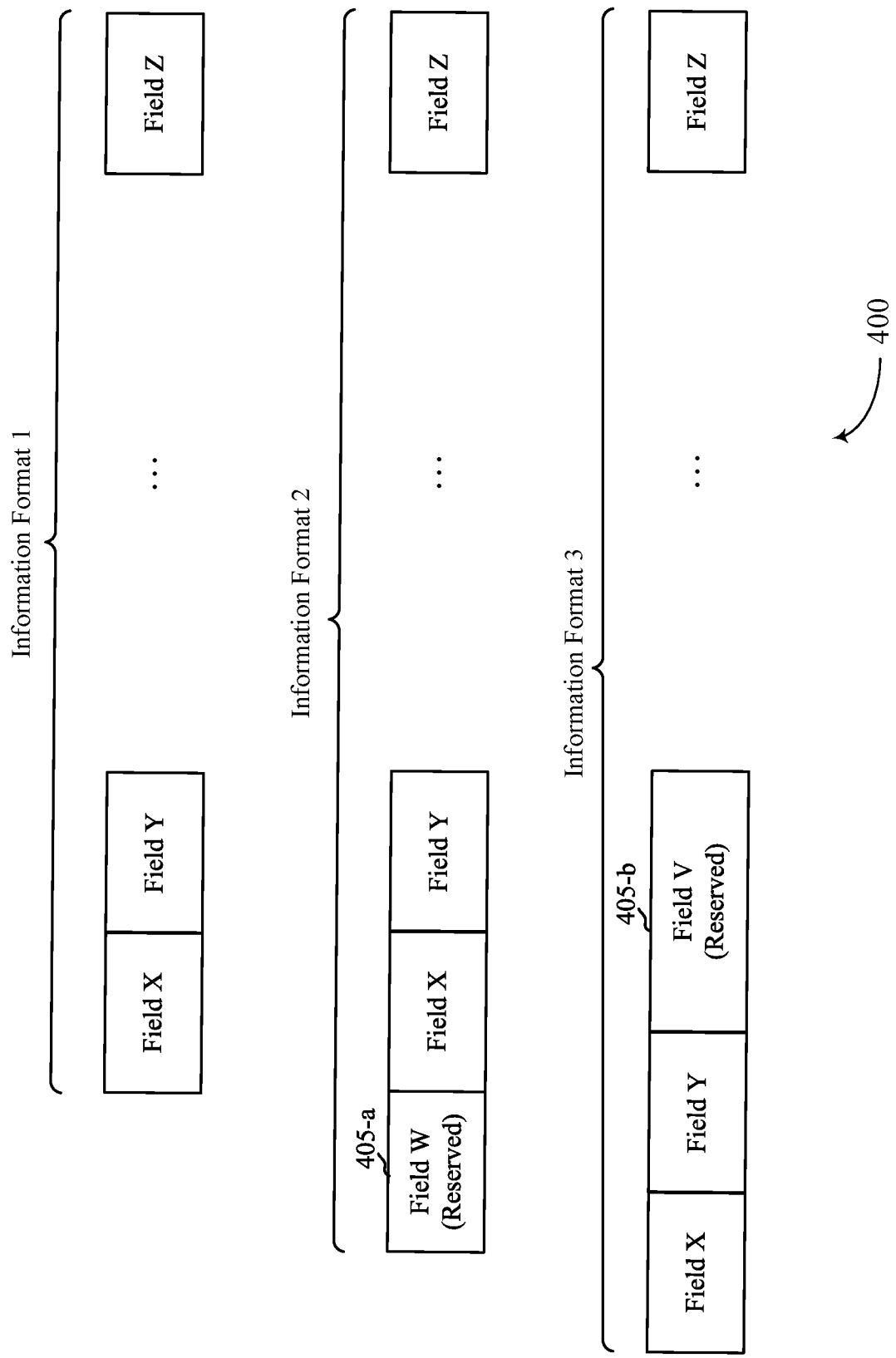
FIG. 4 illustrates an example of information formats that support polar code construction for low-latency decoding and reduced false alarm rate with multiple formats in accordance with aspects of the present disclosure.

FIG. 4 illustrates an example diagram 400 of information formats that support polar code construction for low-latency decoding and reduced false alarm rate with multiple formats in accordance with various aspects of the present disclosure. Depicted are formats 1, 2, and 3, and the principles described herein may apply to information having two or more formats. Each format may include one or more fields that each may include one or more bits. DCI, for example, may include a number of different formats, that each include a number of different fields which may vary across the DCI formats. For example, DCI format 0 may include a format flag field to indicate which format of DCI is being used, a hopping flag field to indicating whether frequency hopping is enabled, a resource block assignment field to indicate which resource blocks have been assigned to a UE, and the like.

The values of the fields of the formats may be mapped to bit locations in an information vector. In the depicted example, one or more of the formats may include one or more reserved fields 405-*a*, 405-*b* to prevent bit values of the fields being mapped to bit locations in an information vector that may create ambiguity at the UE 115-*a* about the bit length of the information vector. In FIG. 4, information format 1 may correspond to bit length k, information format 2 may correspond to bit length k, and information format 3 may correspond to bit length k". Information format 2 may include field W 405-a having a bit value that is reserved, and information format 3 may include field V 405-b having a bit value that is reserved. The locations of the reserved fields 405 may vary and may depend on bit locations of contingent bits within the payload 305. A field that is reserved may signify that a value of one or more bits within that field cannot be a selected value or may not have a particular sequence of selected values. In an example, field 405-b may be a four bit field and may be mapped to bit locations 310-a to 310-d of payload 305-c of FIG. 3. The reservation may prevent bits of field 405-b from having one or more values. For example, the reservation may specify that at least one of the bits of field 405-b mapped to bit locations 310-a, 310-b is non-zero (e.g., the all zero value is reserved). The reservation may enable the base station 105-a to use the values at bit locations 310-a, 310-b for indicating a bit length of the information vector.

Referring again to FIG. 2, the EDC generator 210 may apply an EDC algorithm to the payload 305, which includes an information vector and may include one or more contingent bits δ, to generate an EDC value. The EDC generator 210 may output the payload 305 and the EDC value generated from the payload 305 to the polar encoder 215 for polar encoding. The polar encoder 215 may add one or more frozen bits to the bits of the payload 305 and the bits of the EDC value to generate a data block of length N.

Figure 5:
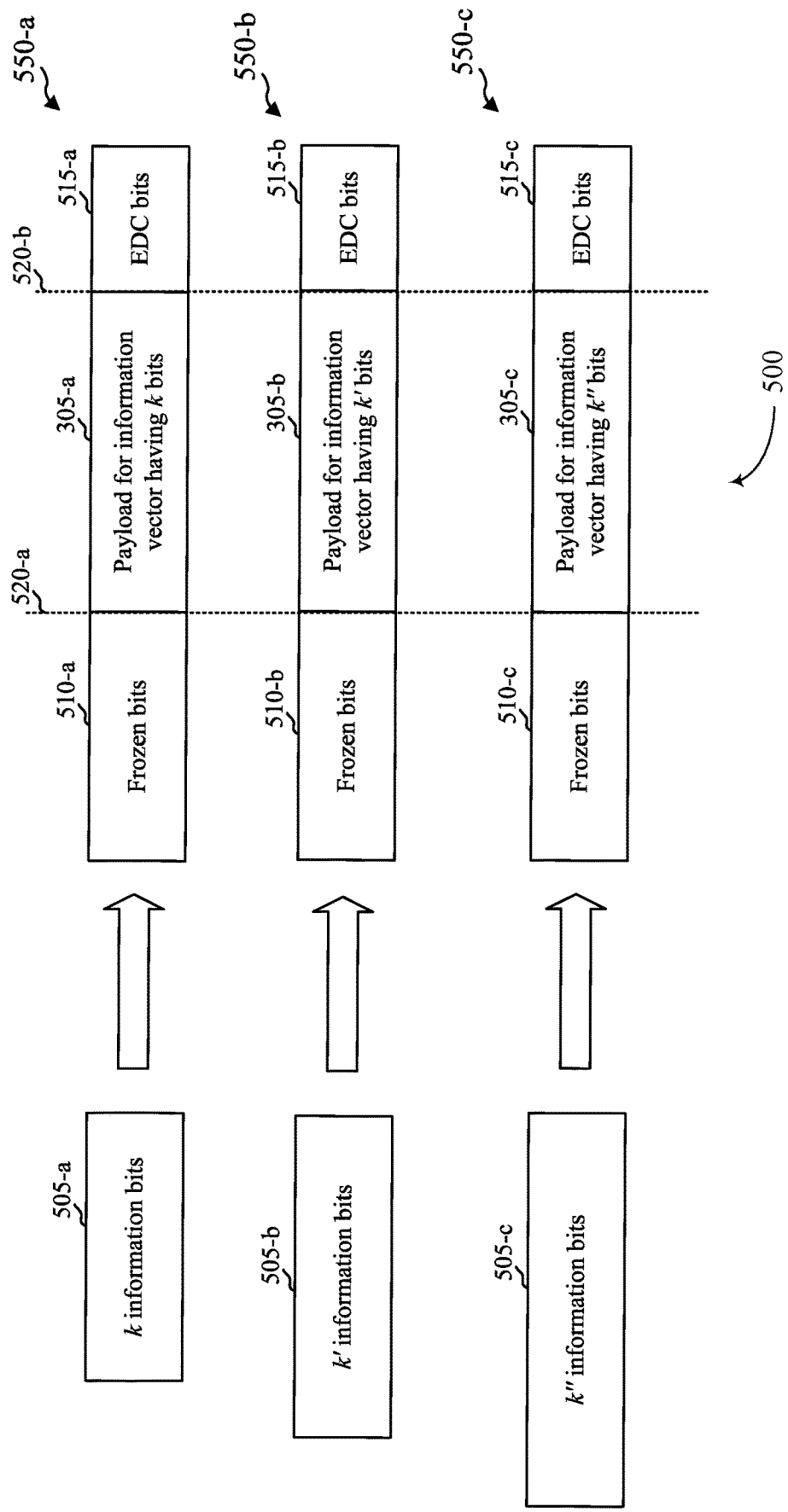
FIG. 5 illustrates an example of data blocks that support polar code construction for low-latency decoding and reduced false alarm rate with multiple formats in accordance with aspects of the present disclosure.

FIG. 5 illustrates an example diagram 500 of data blocks that support polar code construction for low-latency decoding and reduced false alarm rate with multiple formats in accordance with various aspects of the present disclosure. Depicted on the left are information vectors 505-a, 505-b, and 505-c, and on the right are data blocks 550-a, 550-b, and 550-c. In an example, the base station 105-a may select to transmit an information vector 505-a having k information bits corresponding to a first format. The EDC generator 210 may output, to the polar encoder 215, the payload 305-a and EDC bits 515-a corresponding to the generated EDC value (e.g., a 4 bit CRC with bits $C_0$, $C_1$, $C_2$, and $C_3$) generated from payload 305-a. The polar encoder 215 may add one or more frozen bits 510-a to the payload 305-a and EDC bits 515-a of EDC value to generate data block 550-a having a length of N bits.

In a second example, the base station 105-a may select to transmit an information vector 505-b having k' information bits corresponding to a second format. The EDC generator 210 may output payload 305-b and bits of an EDC value 415-b generated from payload 305-b to the polar encoder 215. The polar encoder 215 may add one or more frozen bits 510-b to the payload 305-b and EDC bits 515-b to generate data block 550-b having a length of N bits.

In a third example, the base station 105-a may select to transmit an information vector 505-c having k" information bits corresponding to a third format. The EDC generator 210 may output payload 305-c and EDC bits 515-a generated from payload 305-a to the polar encoder 215. The polar encoder 215 may add one or more frozen bits 510-a to the payload 305-a and EDC bits 515-a to generate data block 550-a having a length of N bits. Dashed lines 520-a, 520-b are shown to illustrate that the bit length of each of payloads 305-a, 305-b, and 305-b is the same even though the information vectors 505-a, 505-b, and 505-c have a different bit lengths. Also, a bit length of each of the EDC bits 515-a, 515-b, and 515-c may be the same length (e.g., each are 4 bits).

With reference to FIG. 2, the polar encoder 215 may polar encode the data block 550 of length N to generate a polar-encoded codeword, and may output the polar-encoded codeword having a codeword size of length N to the rate matcher 220. The polar-encoded codeword is a control message in a particular control message format of the set of possible control message formats. The rate matcher 220 is shown in dashed lines in FIG. 2 to indicate that rate matching is optional and may be skipped. The rate matcher 220 may perform rate matching on the polar-encoded codeword received from the polar encoder 215. Rate matching may involve selecting some bits of the codeword for transmission in a particular TTI. For example, the rate matcher 220 may puncture some of the N bits of the polar-encoded codeword or the modified polar-encoded codeword and output M of the N bits for transmission, where M is a positive integer that is less than N. In some cases, the rate matcher 220 may repeat one or more bits of the N bits of the polar-encoded codeword to generate and output M bits for transmission, where M is greater than N.

The rate matcher 220 may enable of transmission of a codeword within a particular bandwidth. In an example, the rate matcher 220 may determine a channel size as being one of a plurality of channel sizes, and perform rate matching on the polar-encoded codeword to generate a rate matched codeword based on the determined channel size. A channel size may correspond to a bandwidth of a synchronization channel or a bandwidth that is larger than the bandwidth of the synchronization channel. For example, in NR physical broadcast channel (PBCH) design, the number of tones transporting PBCH may be larger than the number of tones transporting a primary synchronization signal (PSS), a second synchronization signal (SSS), or both. The PBCH may be in symbol periods prior to and subsequent to the PSS and SSS such that a tone range for the symbol periods for PBCH, PSS, and SSS may have an "H" shape over multiple symbol periods. The rate matcher 220 may perform rate matching to enable a codeword of length N to support either just PBCH tones that have a range equal to a range of PSS/SSS tones in corresponding symbols, or PBCH tones that have a wider range than PSS/SSS tones in corresponding symbols. The base station 105-a may transmit PBCH having both PBCH channel sizes. That way, the payload is extensible to enable a UE 115-a that supports a narrower bandwidth (e.g., PSS/SSS bandwidth) to decode the codeword in a bandwidth that is equal to a bandwidth of a synchronization channel (e.g., during initial acquisition), or a UE 115-a that supports wider bandwidths (e.g., bandwidths wider than PSS/SSS bandwidths) to decode a PBCH that includes additional data using the same polar code size. These principles may be applied in other contexts. For example, the first channel size may correspond to a first bandwidth of a first control channel (e.g., first PDCCH codeword size) and a second channel size may correspond to a second different bandwidth (e.g., wider bandwidth) of a second control channel (e.g., second PDCCH codeword size). PDCCH may thus include different formats having different numbers of bits of control information as well as different PDCCH codeword lengths.

The rate matcher 220 may output a rate-matched polar-encoded codeword to the modulator 225. The modulator 225 may modulate the rate-matched polar-encoded codeword for transmission to the UE 115-a via wireless communication channel 230. If rate matching is skipped, the modulator 225 may modulate the polar-encoded codeword output from the polar encoder 215 for transmission to the UE 115-a via wireless communication channel 230. The wireless communication channel 230 may distort the signal carrying the polar-encoded codeword with noise.

The UE 115-a may receive a signal that includes a polar-encoded codeword. In an example, the UE 115-a may include a demodulator 235, a decoder 240, and a data sink 245. As the UE 115-a is unaware of the bit length of the information vector in the polar-encoded codeword, the UE 115-a may process the received signal in accordance with multiple decoding hypotheses to determine which of multiple bit lengths for the information vector that the base station 105-a transmitted. A decoding hypothesis may be that the bit length of the information vector has a particular length of a set of possible bit lengths. For example, DCI may have different formats each having a different bit length, and the UE 115-a may have a set of different decoding hypotheses, one for each of the different formats and bit lengths.

The UE 115-a may process a received signal for the polar-encoded codeword to eliminate one or more of the decoding hypotheses. If all but a single decoding hypothesis can be eliminated, then the UE 115-a determines that it was able to successfully decode the polar-encoded codeword. If all of the decoding hypotheses can be eliminated, or two or more hypotheses cannot be eliminated, then the UE 115-a may declare a decoding error. In other examples, if two or more hypotheses cannot be eliminated, the UE 115-a may select one of the two or more hypotheses as the winner and provide a decoding output based on the selected hypothesis.

The demodulator 235 may receive a signal including the transmitted polar-encoded codeword and input the demodulated signal into the decoder 240. The demodulated signal(s) may be, for example, a sequence of logarithmic-likelihood ratio (LLR) values representing a probability value of a received bit being a '0' or a '1'.

The decoder 240 may perform a list decoding algorithm on each set of the LLR values (e.g., Successive Cancellation List (SCL) decoding, CRC-aided SCL decoding, etc.). During SCL or CRC-aided SCL, the decoder 240 may treat the contingent bits as information bits for path generation purposes. Additional aspects of the decoder are described in FIG. 6. If successfully able to decode the polar-encoded codeword using at least one of the decoding hypotheses, the decoder 240 may output bits of the information vector (e.g., the DCI) in accordance with the at least one of the decoding hypotheses to a data sink 245 for use, storage, communication to another device (e.g., transmission via a wired or wireless communication channel), communication via a network, or the like. As noted above, while the examples above describe the base station 105-a performing the encoding and the UE 115-a performing the decoding, the roles may be reversed. Moreover, devices other than the base station 105-a and the user equipment 115-a may perform the encoding and decoding.

Figure 6:
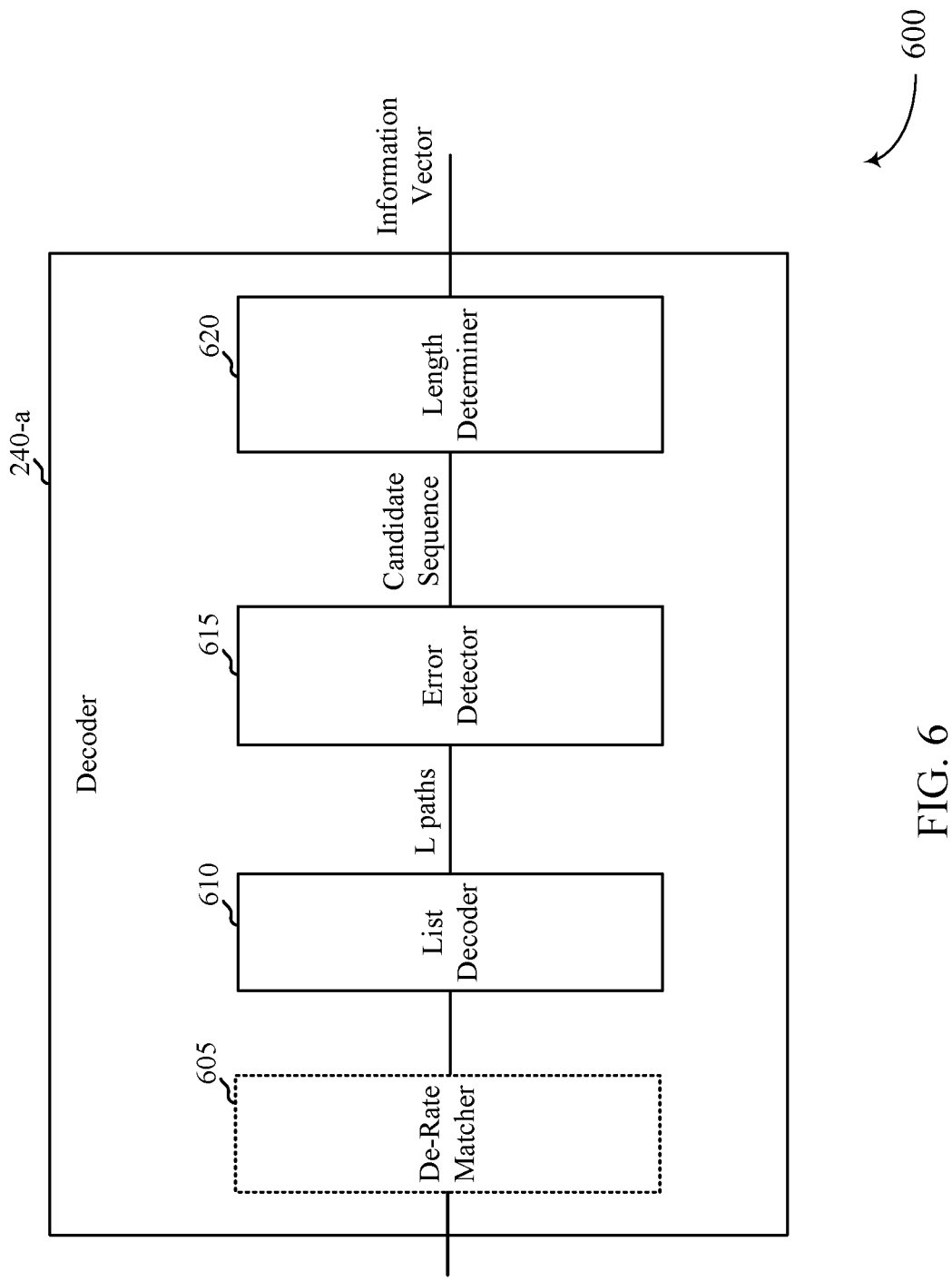
FIG. 6 illustrates an example of a decoder that supports polar code construction for low-latency decoding and reduced false alarm rate with multiple formats in accordance with aspects of the present disclosure.

FIG. 6 illustrates an example diagram 600 of a decoder that supports polar code construction for low-latency decoding and reduced false alarm rate with multiple formats in accordance with various aspects of the present disclosure. The decoder 240-a may decode a polar-encoded codeword to identify a candidate control message. The decoder 240-a may include a de-rate matcher 605, a list decoder 610, an error detector 615, and a length determiner 620. The de-rate matcher 605 may perform de-rate matching on the sequence of LLR values output by the demodulator 235. The de-rate matcher 605 is shown in dashed lines to indicate that rate matching is optional and may be skipped. The de-rate matcher 605 may know the process used by the rate matcher 220 to perform rate-matching on a codeword, and may perform an inverse operation on the sequence of LLR values to generate a de-rate matched sequence of LLR values. The de-rate matcher 605 may output the sequence of LLR values to the list decoder 610.

The list decoder 610 may perform a path search algorithm to search a code tree for decoding a received polar-encoded codeword. As explained below in further detail, the list decoder 610 may use the sequence of LLR values to identify the L best candidate paths through a code tree. In some cases, SCL decoding may be used for decoding the polar-encoded codeword. In SCL decoding, the decoder 240 may determine candidate paths through a code tree and keep a list size L number of paths through the code tree at each decoding level. A candidate path may also be referred to herein as a decoding path. In an example, during decoding, a candidate path may be extended at each sub-channel of a code tree through hard decision values of '0' or '1.' For information bits and contingent bits, extending L candidate paths by one additional bit results in 2L possible paths. In SCL decoding, a decoder may calculate a path metric for each candidate path and select L paths of the 2L possible paths having the best path metrics. For frozen bit locations, each path may be extended by the predetermined value of the frozen bit. A path metric may be a sum of costs for transitioning from bit value to bit value along a candidate path. Adding a bit having a particular value to a candidate path may be associated with a cost representing a probability of the bit value being correct. Each candidate path may correspond to a bit sequence through the code tree and may be associated with a path metric for that bit sequence.

The list decoder 610 may output L paths to the error detector 615. Each path may correspond to a length N decoding candidate bit sequence that may be mapped to bits in data block 550. The error detector 615 may iteratively perform an error detection algorithm on bit sequences corresponding to the selected L paths in path metric order. The error detector 615 may begin with the path having the best path metric, and may stop as soon as one of the bit sequences passes the error detection algorithm, or all of the bit sequences have been checked and none passed the error detection algorithm.

For a particular path, the error detector 615 may extract a payload portion of the decoding candidate bit sequence (e.g., bits corresponding to the location of payload 305 within data block 550) and an EDC portion of the decoding candidate bit sequence (e.g., bits corresponding to the location of the EDC bits 515 within data block 550). The error detector 615 may extract an EDC value from the EDC portion of the decoding candidate bit sequence, may calculate an EDC value from the bits of the payload portion of the decoding candidate bit sequence using the same EDC algorithm used by the EDC generator 210, and determine whether the extracted EDC value corresponds to the calculated EDC value (e.g., compare to determine if they match). If the extracted and calculated EDC values do not correspond, the error detector 615 may determine that the bit sequence has failed error detection and may proceed to check the next path. If all paths fail error detection, the error detector 615 may declare a decoding failure, and the decoder 240-a may skip performing the operations of the length determiner 620 described below. If the extracted and calculated EDC values correspond (e.g., match), the error detector 615 may output the bits of the payload portion extracted from the decoding candidate bit sequence to the length determiner 620.

The length determiner 620 may identify a control message format in the set of possible control message formats for the candidate control message based at least in part on the decoding hypotheses corresponding to the different number of information bits. In an example, the length determiner 620 may apply one or more decoding hypotheses to process the bits of the payload portion to identify a control message format and corresponding length of the information vector 505 included in the payload 305. A decoding hypothesis may correspond to an expected bit order for a bit sequence of the payload of a particular format of the set of multiple possible formats. A decoding hypothesis may specify bit locations, and bit values, within the payload 305 for at least a subset of the contingent bits δ (e.g., at bit locations 310-*a* to 310-*d*). The UE 115 may determine whether a received bit sequence satisfies any of the decoding hypotheses.

With reference to FIG. 3, the length determiner 620 may process the bit values at bit locations 310-*a* to 310-*d* within a payload portion of the decoding candidate bit sequence to determine which decoding hypothesis, if any, is satisfied. For example, with reference to FIG. 3, a first decoding hypothesis for a payload of length k may be that the bit value is zero for each of contingent bits $\delta_1$, $\delta_2$, $\delta_3$, and $\delta_4$ at bit locations 310-*a* to 310-*d* within payload 305. A second decoding hypothesis for a payload of length k' may be that the bit value is zero for each of contingent bits $\delta_5$ and $\delta_6$ at bit locations 310-*a*, 310-*b* within payload 305, and that a bit value of at least one of bit locations 310-*c*, 310-*d* is non-zero. A third decoding hypothesis for a payload of length k" may be that a bit value of at least one of bit locations 310-*a*, 310-*b* is non-zero.

If the length determiner 620 determines that a bit value of the contingent bits δ at each of bit locations 310-*a* to 310-*b* is zero, the length determiner 620 determines that the decoding hypothesis of length k is satisfied and that the information vector 505 in payload 305 has length k. In another example, the length determiner 620 may determine that a decoding hypothesis of length k' is satisfied if a bit value of the contingent bits δ at each of bit locations 310-*a* and 310-*b* is zero, and that a bit value of at least one of bit locations 310-*c* or 310-*d* is non-zero. If that is the case, the length determiner 620 may determine that a received information vector 505 in payload 305 has length k'. In a further example, the length determiner 620 may determine that a decoding hypothesis of length k" is satisfied if a bit value of at least one of bit locations 310-*a*, 310-*b* is non-zero, and hence determines that a received information vector 505 in payload 305 has length k". It should be noted that the above example describes the information vector 505 as having one of three bit lengths, and the principles described herein may be applied to an information vector having two or more bit lengths. For the decoding hypothesis that is satisfied, the length determiner 620 may extract bits of the information vector 505 corresponding to the decoding hypothesis for a particular format, and may output the extracted bits of the information vector 505 to the data sink 245. For example, the length determiner 620 may obtain control information from the candidate control message based at least in part on the identified control message format.

When there are more than two decoding hypotheses, a bit length of an information vector for each decoding hypothesis may be written as a function of a shortest bit length k. For example, if there are M decoding hypotheses $K_0$, $K_1$, ... $K_{M-1}$, the bit length of each hypothesis may be expressed as $K_0$=k, $K_1$=k+$\delta_1$, ..., $K_{M-1}$=k+$\delta_{M-1}$, where $\delta_1$, ..., $\delta_{M-1}$ may represent a number of bits. Then the EDC value may be derived based on a payload of size=k+MAX(0, $\delta_1$, $\delta_2$, ..., $\delta_{M-1}$) bits. Similar to the case where there are only two decoding hypotheses (e.g., M=2), the $\delta_i$ bits may be included in sub-channels whose reliability rank is worse than $k_i$, and the remaining sub-channels may be frozen bits.

The examples described herein may provide a number of benefits. In conventional solutions, a decoder decodes a N bit LLR codeword M times, once for each of the M bit length hypotheses. The decoder also derives and compares a CRC M times. For a CRC having a bit length of C bits, the false alarm rate is $M*2^{-C}$. In the examples described herein, the list decoder 610 outputs a N bit LLR, a single time, that the error detector 615 uses to derive and compare an EDC value for each of the multiple decoding hypotheses. A list decoding algorithm is thus operated M fewer times, resulting in a false alarm rate of $2^{-C}$. In an example, if a 4-bit CRC is used and M=4, the false alarm rate for a conventional solution is $4*2^{-4}$=0.25, whereas the false alarm rate for the examples described herein is $2^{-4}$=0.0625.

The examples described herein also enable definition of a set of control information formats to specify operation in two or more modes. For example, a first control information format corresponding to the first information bit length may be associated with a first communication type (e.g., a URLLC mode) and a second control information format corresponding to the second information bit length may be associated with a second communication type (e.g., a non-URLLC mode). When operating in the URLLC mode, a UE 115-*a* may attempt to decode each of payload hypotheses k, k', where contingent bits δ indicate URLLC specific information when non-zero. When operating in a non-URLLC mode, a UE 115-*a* may decode a payload hypothesis of bit length k, and skip attempting to decode payload hypothesis of bit length k'. For example, a set of conventional DCI formats for a non-URLLC mode may be re-defined to include one or more contingent bits δ, and the one or more contingent bits δ may transport information bits in the URLLC mode. Sub-channels transporting the one or more contingent bits δ may be selected based on reliability (or capacity) ranking of the sub-channels. Advantageously, if a conventional solution has M decoding hypotheses, the URLLC mode as described herein may improve the decoding latency and/or a false alarm rate by M (e.g., total decoding latency of 1/M and a false alarm rate of 1/M as compared to conventional solutions).

The examples described herein may also advantageously provide for joint decoding of M decoding hypotheses, lowering the false alarm rate. When using list decoding (e.g., SCL), multiple path candidates for contingent bits δ of various M hypotheses may be jointly compared. For example, various payload formats with M different sizes may be defined with the goal of low latency decoding (e.g., for URLLC) or very low power consumption (e.g., for mMTC) against those M decoding hypotheses with joint M decoding hypothesis successive cancellation list (SCL) polar decoding. Using the techniques described herein, the UE 115-*a* may operate, on the signal including the polar-encoded codeword having a defined size, a listing decoding algorithm a single time to generate L candidate paths and L bit sequences of length N. The UE 115-*a* may check the L bit sequences of length N against the M decoding hypotheses, and then derive and check EDC values against those M decoding hypotheses. For a first decoding hypothesis that passes error detection according to the contents of the contingent bits δ, of the M decoding hypotheses, the UE 115-*a* may then extract the information bits according to the first decoding hypothesis.

Thus, the base station 105-*a* may generate the polar-encoded codeword in a manner that improves the ability of the UE 115-*a* to determine which of multiple formats and corresponding bit lengths was used for a transmitted information vector. The examples provided herein may improve the ability of a receiver to determine the bit length of a transmitted information vector, may improve decoder latency, and may improve a false alarm rate. The techniques described herein are suitable at least in scenarios where a signal to noise ratio (SNR) is relatively high, when the performance tradeoff between detection rate and false alarm rate favors a lower false alarm rate, or both. Moreover, detection rate and false alarm rate are tradeoffs in system performance design. To balance the tradeoff between the detection rate and the false alarm rate, the number of EDC bits may be adjusted, while still benefiting from a M-time reduction in M-hypothesis decoding latency and M-time reduction in the false alarm rate.

Figure 7:
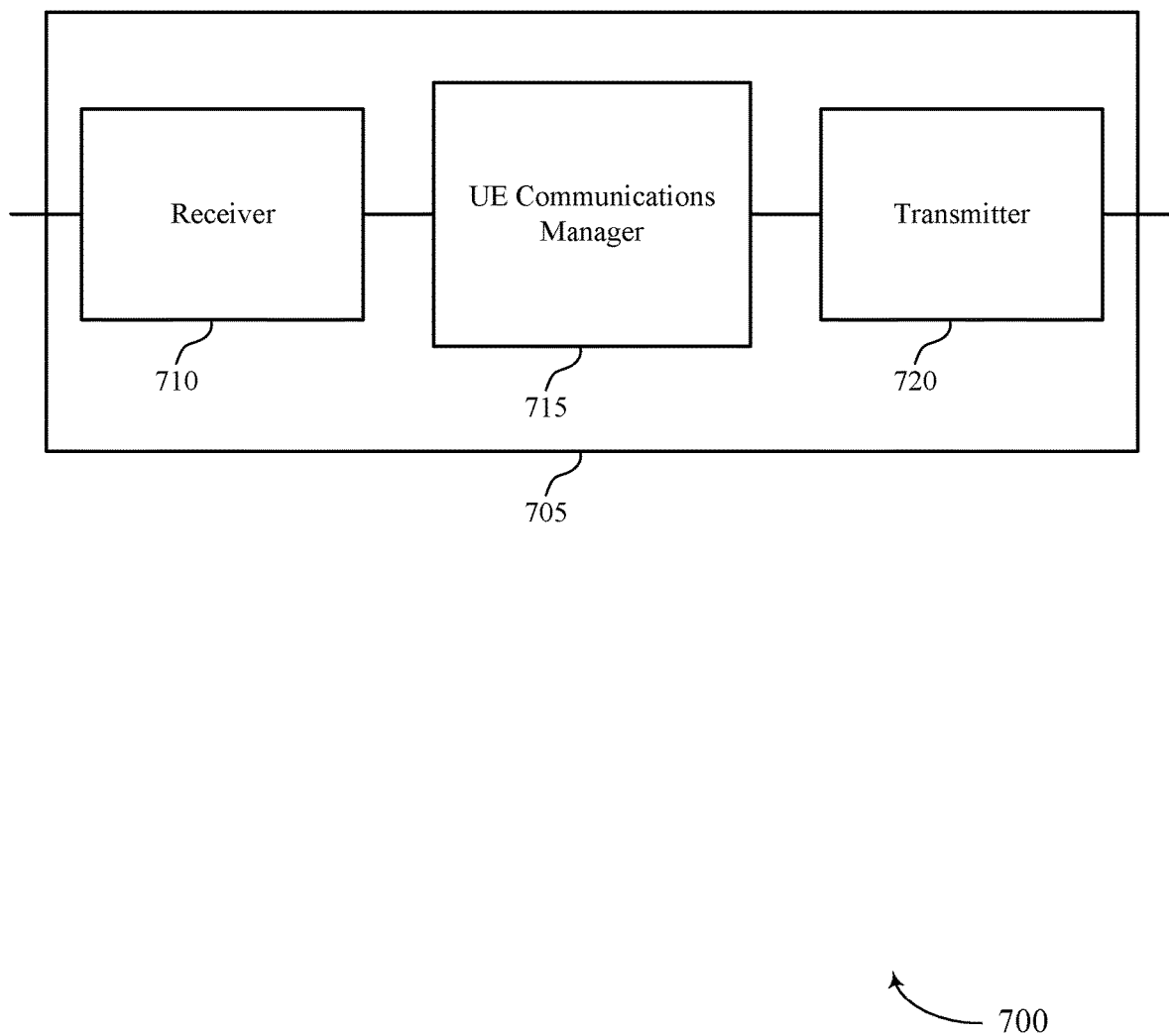
FIGS. 7 through 9 show block diagrams of a device that supports polar code construction for low-latency decoding and reduced false alarm rate with multiple formats in accordance with aspects of the present disclosure.

FIG. 7 shows a block diagram 700 of a wireless device 705 that supports polar code construction for low-latency decoding and reduced false alarm rate with multiple formats in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive a signal that includes a polar-encoded codeword. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may determine a set of possible control message formats for a polar-encoded codeword, each of the set of the possible control message formats having a different bit length (i.e., number of information bits), where the polar-encoded codeword is generated based on polar encoding a payload having a same number of bits for any of the set of possible control message formats, decode the polar-encoded codeword to identify a decoding bit sequence, determine that a payload portion of the decoding candidate bit sequence corresponding to a longest of the different bit lengths passed an error detection check, identify a control message of the payload portion corresponding to a control message format in the set of possible control message formats based on a set of hypotheses corresponding to the different bit lengths, and obtain control information from the control message based on the control message format.

Transmitter 720 may transmit signals generated by other components of the device, including a signal that includes a polar-encoded codeword. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
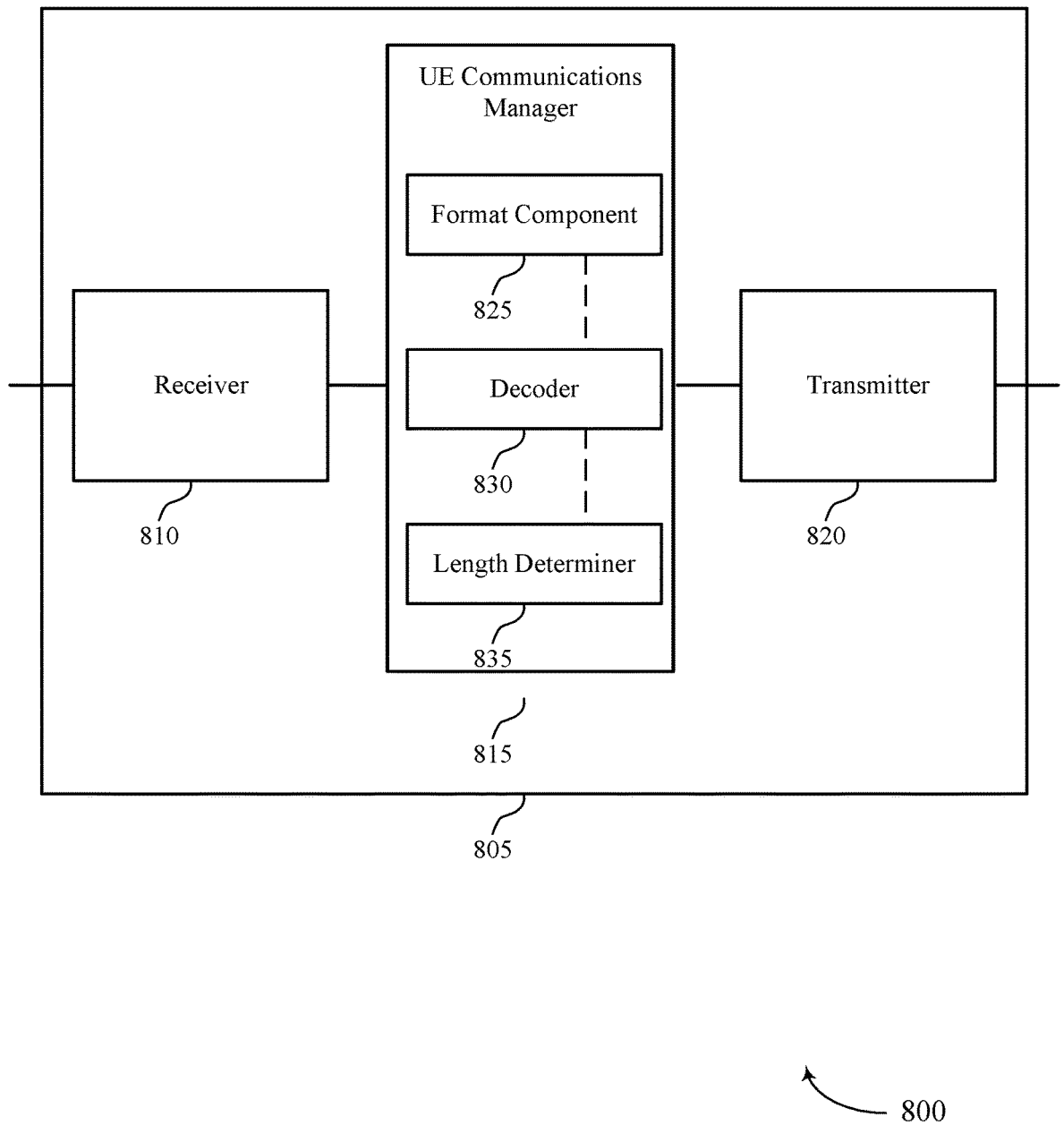

FIG. 8 shows a block diagram 800 of a wireless device 805 that supports polar code construction for low-latency decoding and reduced false alarm rate with multiple formats in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive a signal that includes a polar-encoded codeword. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10.

UE communications manager 815 may also include format component 825, decoder 830, and length determiner 835.

Format component 825 may determine a set of possible control message formats for a polar-encoded codeword, each of the set of the possible control message formats having a different bit length, where the polar-encoded codeword is generated based on polar encoding a payload having a same number of bits for any of the set of possible control message formats. Format component 825 may identify a control message of the payload portion corresponding to a control message format in the set of possible control message formats based on a set of hypotheses corresponding to the different bit lengths. In some cases, a first control information format corresponding to the first bit length is associated with a first communication type and a second control information format corresponding to the second bit length is associated with a second communication type.

Decoder 830 may decode the polar-encoded codeword to identify a decoding candidate bit sequence. In some cases, decoding the polar-encoded codeword to identify the candidate control message may include: decoding the polar-encoded codeword having a codeword size to generate the decoding candidate bit sequence corresponding to the candidate control message. In some cases, decoding the polar-encoded codeword to identify the decoding candidate bit sequence includes: performing a list decoding algorithm to generate a plurality of decoding candidate bit sequences. In some cases, decoder 830 may determine that a payload portion of the decoding candidate bit sequence corresponding to a longest of the different bit lengths passes an error detection check.

Length determiner 835 may obtain control information from the control message based on the control message format and select bit length from the different bit lengths for the control information format based at least in part on the bit values of the at least one contingent bit. In some cases, identifying the control message may include determining bit values of at least one contingent bit within the payload portion. In some cases, obtaining the control information from the candidate control message includes: outputting, from the payload portion, the information bit vector having the selected information bit length.

In some cases, the different bit lengths comprise a first bit length corresponding to the longest bit length minus a number of bits of the at least one contingent bit and a second bit length corresponding to the longest bit length. In some cases, the control message format may correspond to the first bit length based at least in part on bit values of the at least one contingent bit being zero. In some cases, the control message format may correspond to the second bit length based at least in part on of the bit values of the at least one contingent bit being non-zero. In some cases, the set of different bit lengths may include a third bit length corresponding to the longest bit length minus a number of bits of a subset of the at least one contingent bit. In some cases, the control information format may correspond to the third bit length based on the bit values of the subset of the at least one contingent bit being zero, and at least one bit value of the at least one contingent bit being non-zero.

Transmitter 820 may transmit signals generated by other components of the device, including a polar-encoded codeword. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
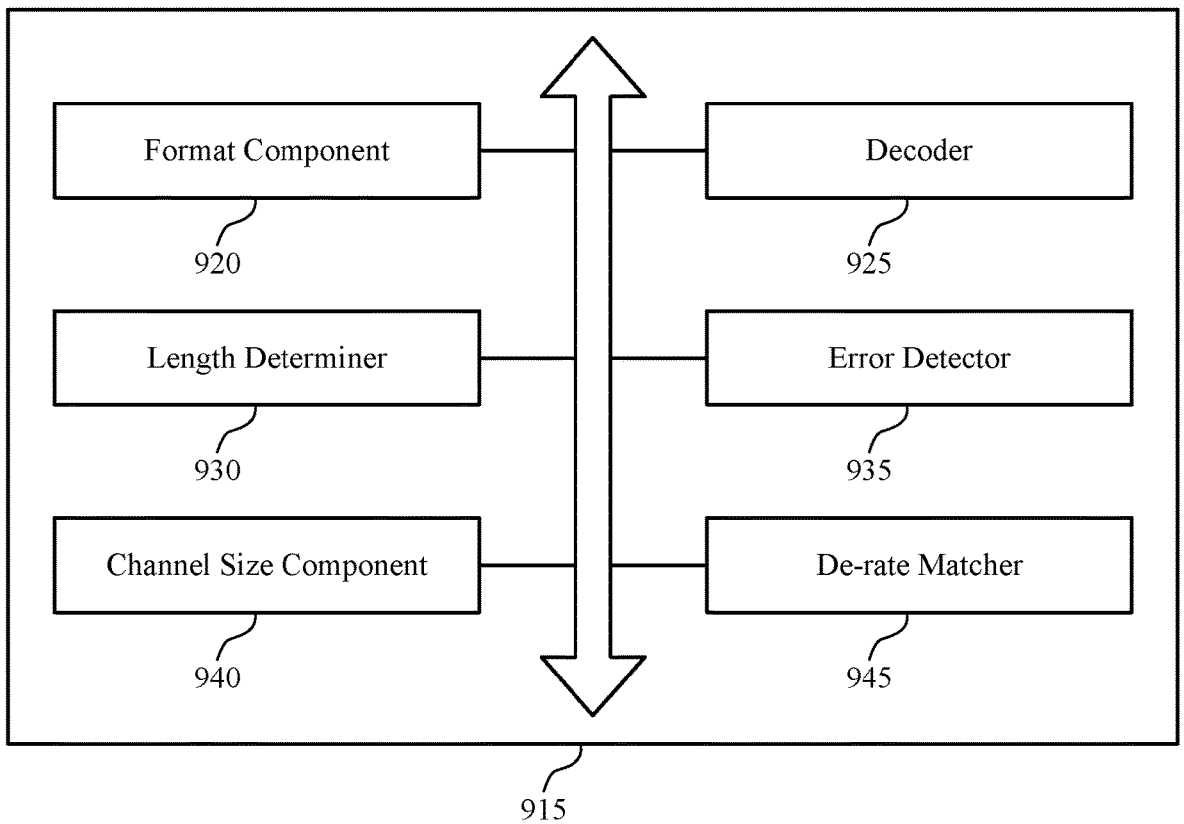

FIG. 9 shows a block diagram 900 of a UE communications manager 915 that supports polar code construction for low-latency decoding and reduced false alarm rate with multiple formats in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include format component 920, decoder 925, length determiner 930, error detector 935, channel size component 940, and de-rate matcher 945. Each of these modules may communicate, directly or indirectly, with one another (e.g., via one or more buses).

Format component 920 may determine a set of possible control message formats for a polar-encoded codeword, each of the set of the possible control message formats having a different bit length, where the polar-encoded codeword is generated based on polar encoding a payload having a same number of bits for any of the set of possible control message formats. Format component 920 may identify a control message of the payload portion corresponding to a control message format in the set of possible control message formats based on a set of hypotheses corresponding to the different bit lengths. In some cases, a first control information format corresponding to the first bit length is associated with a first communication type and a second control information format corresponding to the second bit length is associated with a second communication type.

Decoder 925 may decode the polar-encoded codeword to identify a candidate control message. In some cases, decoding the polar-encoded codeword to identify the candidate control message includes: decoding a signal for the polar-encoded codeword having a codeword size to generate a decoding candidate bit sequence corresponding to the candidate control message. In some cases, decoding the signal for the polar-encoded codeword having the codeword size to generate the decoding candidate bit sequence includes: performing a list decoding algorithm to generate the decoding candidate bit sequence based on the signal.

Length determiner 930 may obtain control information from the control message based on the control message format and select bit length from the different bit lengths for the control information format based at least in part on the bit values of the at least one contingent bit. In some cases, identifying the control message may include determining bit values of at least one contingent bit within the payload portion. In some cases, obtaining the control information from the candidate control message includes: outputting, from the payload portion, the information bit vector having the selected information bit length.

In some cases, the different bit lengths comprise a first bit length corresponding to the longest bit length minus a number of bits of the at least one contingent bit and a second bit length corresponding to the longest bit length. In some cases, the control message format may correspond to the first bit length based at least in part on bit values of the at least one contingent bit being zero. In some cases, the control message format may correspond to the second bit length based at least in part on of the bit values of the at least one contingent bit being non-zero. In some cases, the set of different bit lengths may include a third bit length corresponding to the longest bit length minus a number of bits of a subset of the at least one contingent bit. In some cases, the control information format may correspond to the third bit length based on the bit values of the subset of the at least one contingent bit being zero, and at least one bit value of the at least one contingent bit being non-zero.

Error detector 935 may generate an error check value for a payload portion of the decoding candidate bit sequence based on a longest bit length of a set of bit lengths available for an information bit vector for the codeword size, and determine that the payload portion passes an error detection check based on the error check value. In some cases, determining that the payload portion passes the error detection includes: extracting a received error check value from the decoding candidate bit sequence and comparing the received error check value to a calculated representation of the error check value.

Channel size component 940 may determine a channel size as being one of a set of channel sizes. In some cases, the channel size may be a size of a physical broadcast channel. In some cases, a first channel size of the set of channel sizes may be equal to a bandwidth of a synchronization channel, and a second channel size of the set of channel sizes may be larger than the bandwidth of the synchronization channel. In some cases, a first channel size of the set of channel sizes may be equal to a bandwidth of a first control channel, and a second channel size of the set of channel sizes may be larger than the bandwidth of the first control channel.

De-rate matcher 945 may perform de-rate matching on the polar-encoded codeword to generate a de-rate matched codeword, where decoding the polar-encoded codeword to identify the decoding candidate bit sequence is based at least in part on the de-rate matched codeword.

Figure 10:
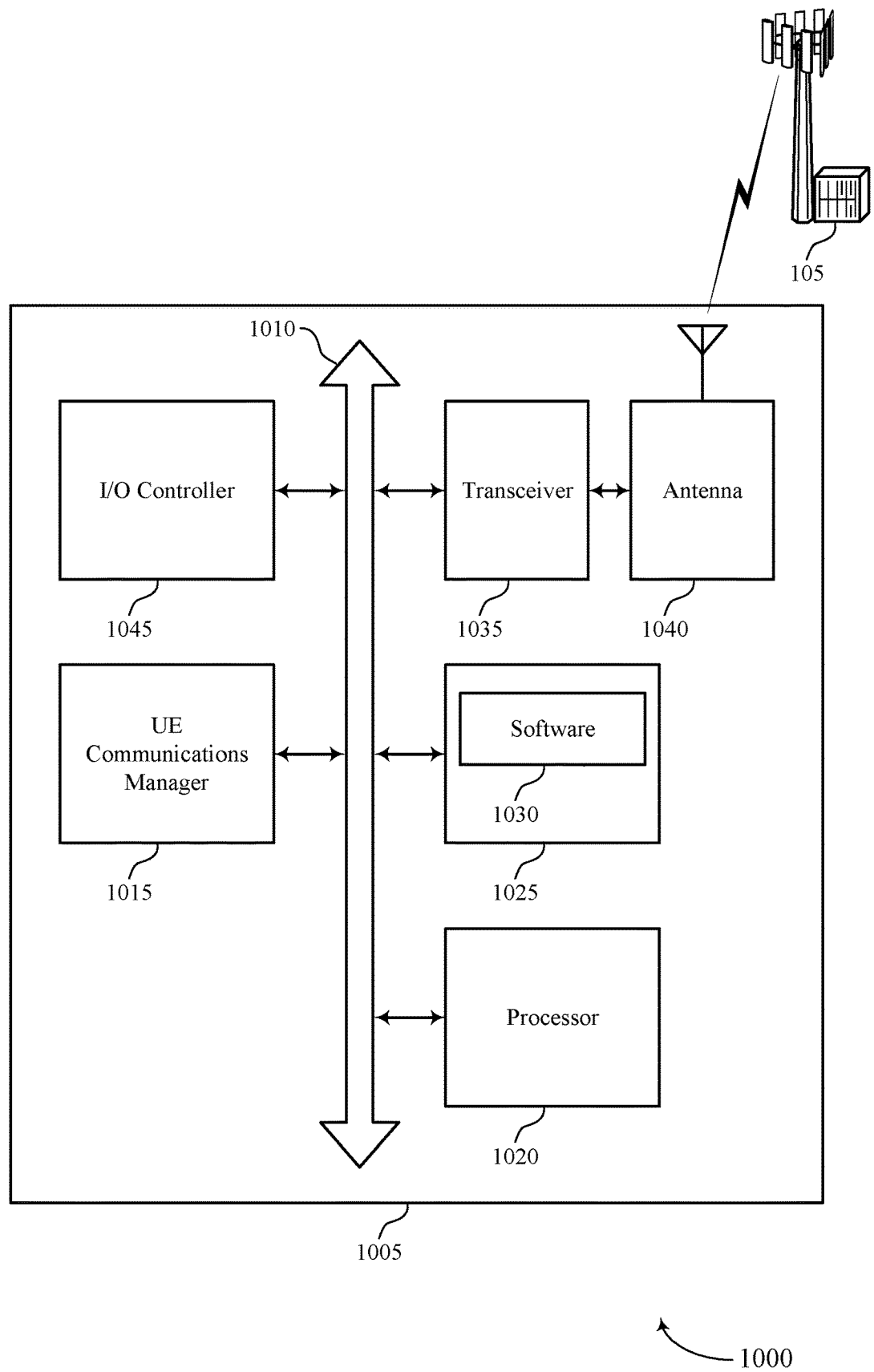
FIG. 10 illustrates a block diagram of a system including a UE that supports polar code construction for low-latency decoding and reduced false alarm rate with multiple formats in accordance with aspects of the present disclosure.

FIG. 10 shows a diagram of a system 1000 including a device 1005 that supports polar code construction for low-latency decoding and reduced false alarm rate with multiple formats in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting polar code construction for low-latency decoding and reduced false alarm rate with multiple formats).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support polar code construction for low-latency decoding and reduced false alarm rate with multiple formats. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
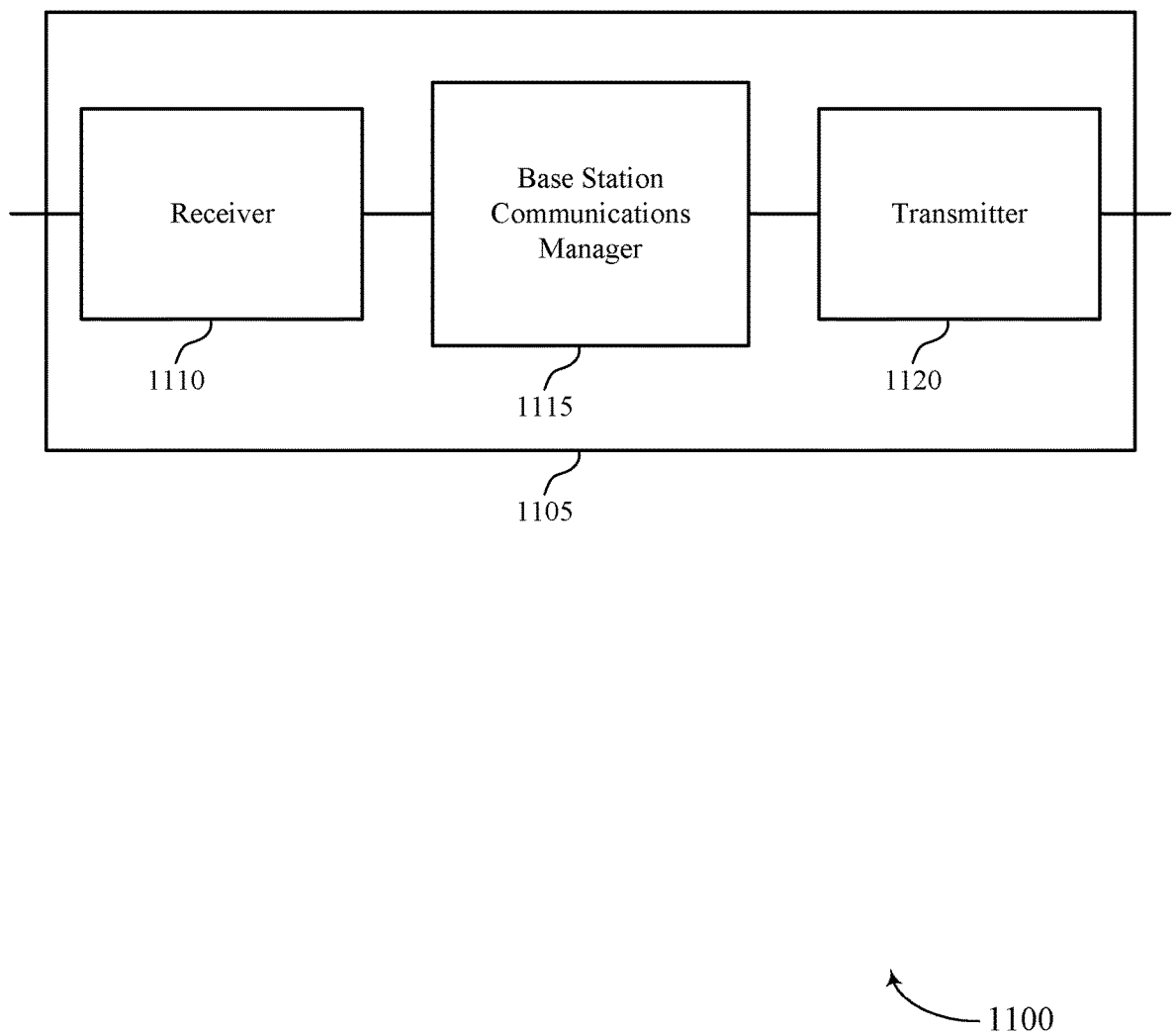
FIGS. 11 through 13 show block diagrams of a device that supports polar code construction for low-latency decoding and reduced false alarm rate with multiple formats in accordance with aspects of the present disclosure.

FIG. 11 shows a block diagram 1100 of a wireless device 1105 that supports polar code construction for low-latency decoding and reduced false alarm rate with multiple formats in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive a signal that includes a polar-encoded codeword. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify control information for transmission to a wireless device, such as a UE. In some cases, the base station communications manager 1115 may select a control message format of a set of possible control message formats for the control information, each of the set of the possible control message formats corresponding to a different bit length (i.e., number of information bits), generate an error check value based at least in part on a payload comprising the control information, the payload having a longest of the different bit lengths, polar encode the payload and the error check value to generate a polar encoded codeword, the payload having a same number of bits for any of the set of possible control message formats, and transmit the polar-encoded codeword to the wireless device.

Transmitter 1120 may transmit signals generated by other components of the device, including a signal that includes a polar-encoded codeword. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
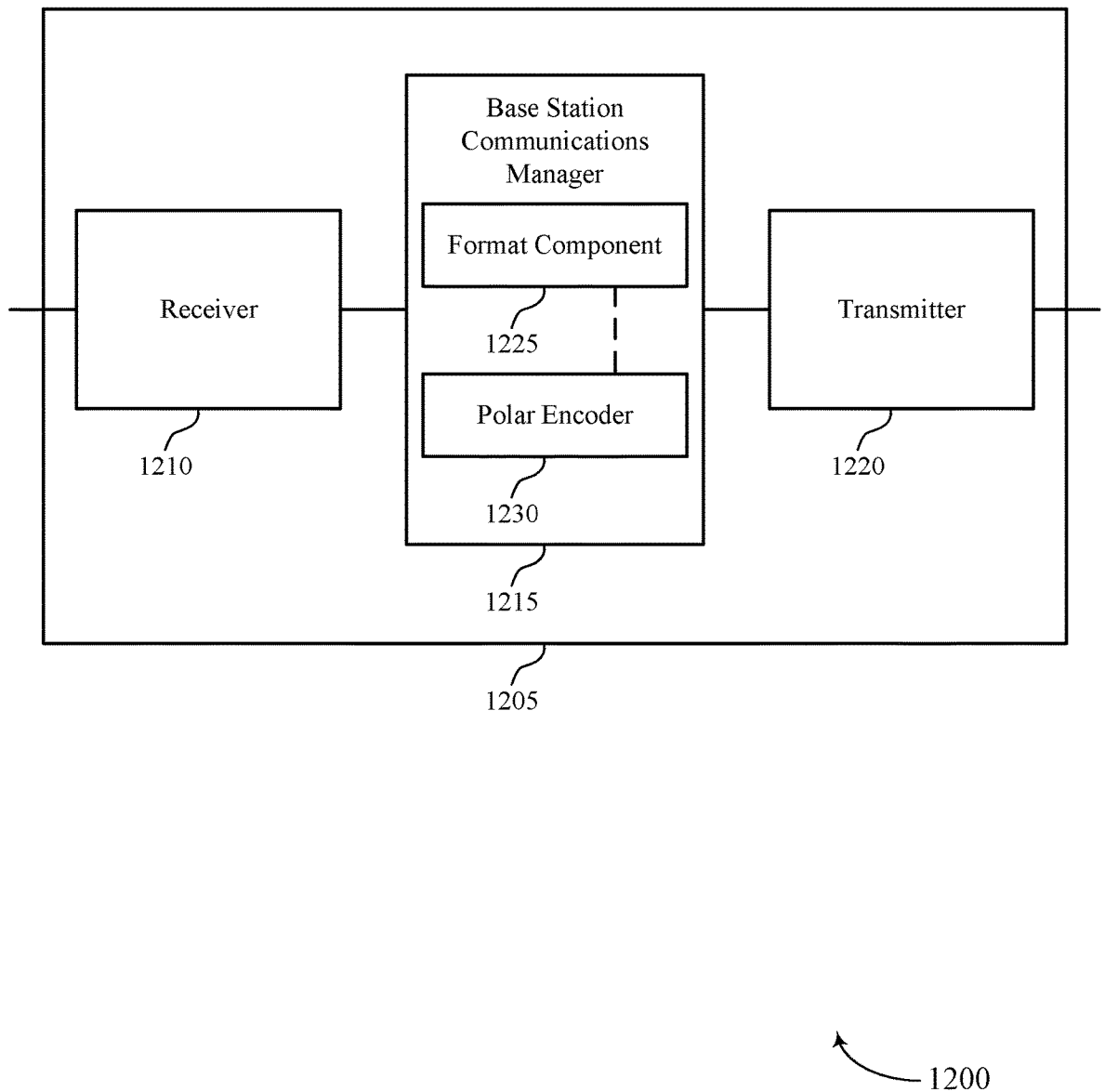

FIG. 12 shows a block diagram 1200 of a wireless device 1205 that supports polar code construction for low-latency decoding and reduced false alarm rate with multiple formats in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive a signal that includes a polar-encoded codeword. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include format component 1225 and polar encoder 1230.

Format component 1225 may identify control information for transmission to a wireless device, such as a UE. In some cases, format component 1225 may select a control message format of a set of possible control message formats for the control information, each of the set of the possible control message formats corresponding to a different number of information bits (i.e., different bit length). In some cases, a first control information format corresponding to the first bit length may be associated with a first communication type and a second control information format corresponding to the second bit length may be associated with a second communication type. In some cases, the set of possible message formats may comprise all control message formats associated with a size of the polar-encoded codeword.

Polar encoder 1230 may polar encode a payload and the error check value to generate a polar-encoded codeword, the payload having a same number of bits for any of the set of possible control message formats and transmit the polar-encoded codeword to the wireless device.

Transmitter 1220 may transmit signals generated by other components of the device, including a signal that includes a polar-encoded codeword. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
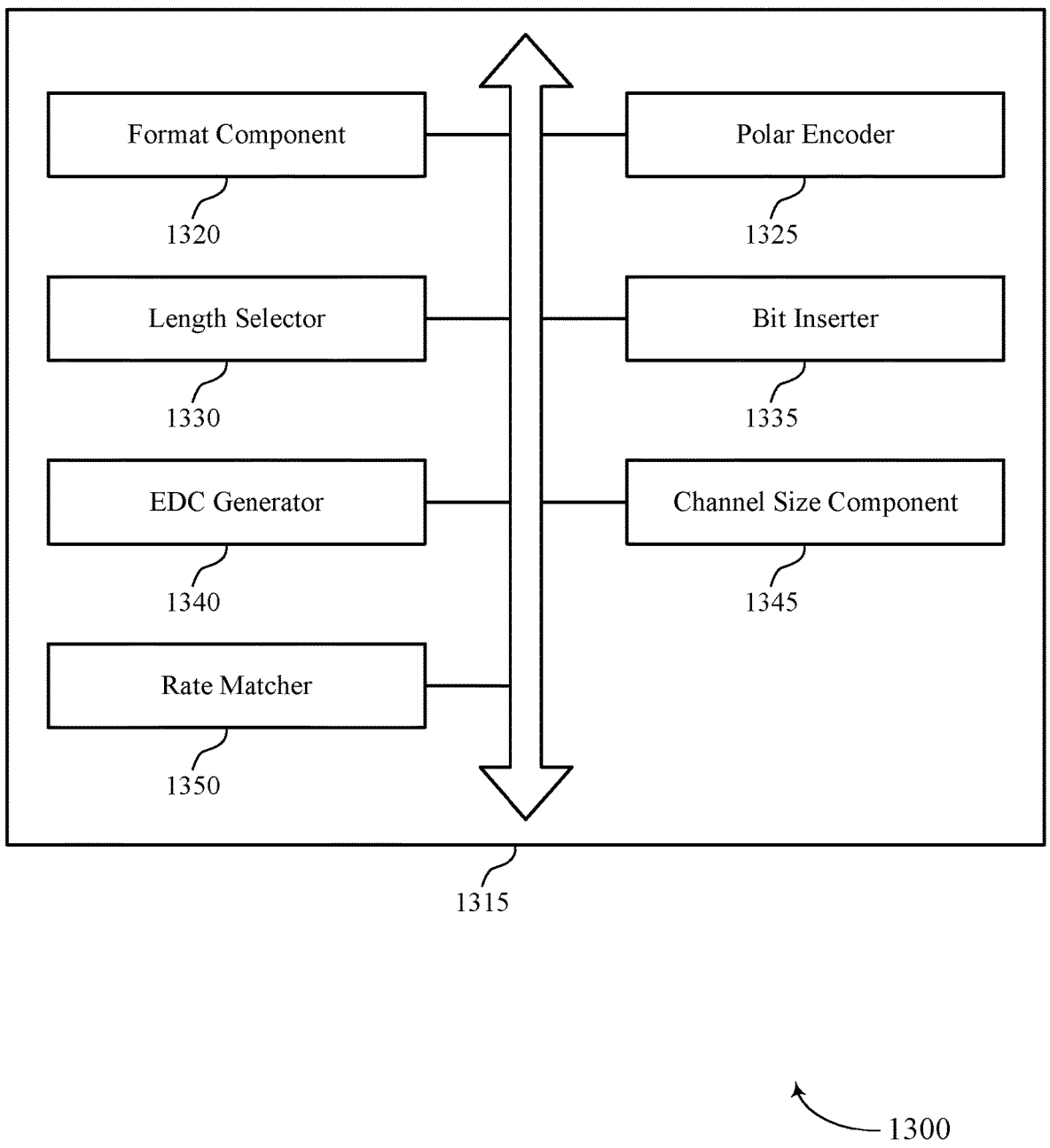

FIG. 13 shows a block diagram 1300 of a base station communications manager 1315 that supports polar code construction for low-latency decoding and reduced false alarm rate with multiple formats in accordance with aspects of the present disclosure. The base station communications manager 1315 may be an example of aspects of a base station communications manager 1415 described with reference to FIGS. 11, 12, and 14. The base station communications manager 1315 may include format component 1320, polar encoder 1325, length selector 1330, bit inserter 1335, EDC generator 1340, channel size component 1345, and rate matcher 1350. Each of these modules may communicate, directly or indirectly, with one another (e.g., via one or more buses).

Format component 1320 may identify control information for transmission to a wireless device, such as a UE. In some cases, format component 1320 may select a control message format of a set of possible control message formats for the control information, each of the set of the possible control message formats corresponding to a different number of information bits (i.e., different bit length). In some cases, a first control information format corresponding to the first bit length may be associated with a first communication type and a second control information format corresponding to the second bit length may be associated with a second communication type. In some cases, the set of possible message formats may comprise all control message formats associated with a size of the polar-encoded codeword.

Polar encoder 1325 may polar encode a payload and the error check value to generate a polar-encoded codeword, the payload having a same number of bits for any of the set of possible control message formats and transmit the polar-encoded codeword to the wireless device.

Length selector 1330 may identify an information bit vector having a selected information bit length of a set of information bit lengths available for encoding to obtain a codeword of a codeword size. In some cases, the different bit lengths includes a first bit length corresponding to the longest bit length minus a number of bits of the at least one contingent bit and a second bit length corresponding to the longest bit length.

Bit inserter 1335 may insert at least one contingent bit to the control information to obtain the payload. In some cases, the payload may have a longest information bit length of the plurality of information bit lengths. In some cases, bit inserter 1335 may set each bit value of the at least one contingent bit to zero. In some cases, the different bit lengths may comprise a third bit length corresponding to the longest bit length minus a number of bits of a subset of the at least one contingent bit. In some cases, the control information corresponds to the third bit length, the method further including setting each bit value of the subset of the at least one contingent bit to zero and at least one bit value of the at least one contingent bit to non-zero.

EDC generator 1340 may generate an error check value for the payload. In some cases, generating the error check value for the information bit vector includes: applying an EDC algorithm to the information bit vector and at least one identification bit to generate the EDC value.

Channel size component 1345 may determine a channel size as being one of a set of channel sizes. In some cases, a first channel size of the set of channel sizes is equal to a bandwidth of a first control channel, and a second channel size of the set of channel sizes is larger than the bandwidth of the first control channel. In some cases, the channel size is a size of a physical broadcast channel. In some cases, a first channel size of the set of channel sizes is equal to a bandwidth of a synchronization channel, and a second channel size of the set of channel sizes is larger than the bandwidth of the synchronization channel.

Rate matcher 1350 may perform rate matching on the codeword to generate a rate matched codeword, where transmitting the codeword includes transmitting the rate matched codeword.

Figure 14:
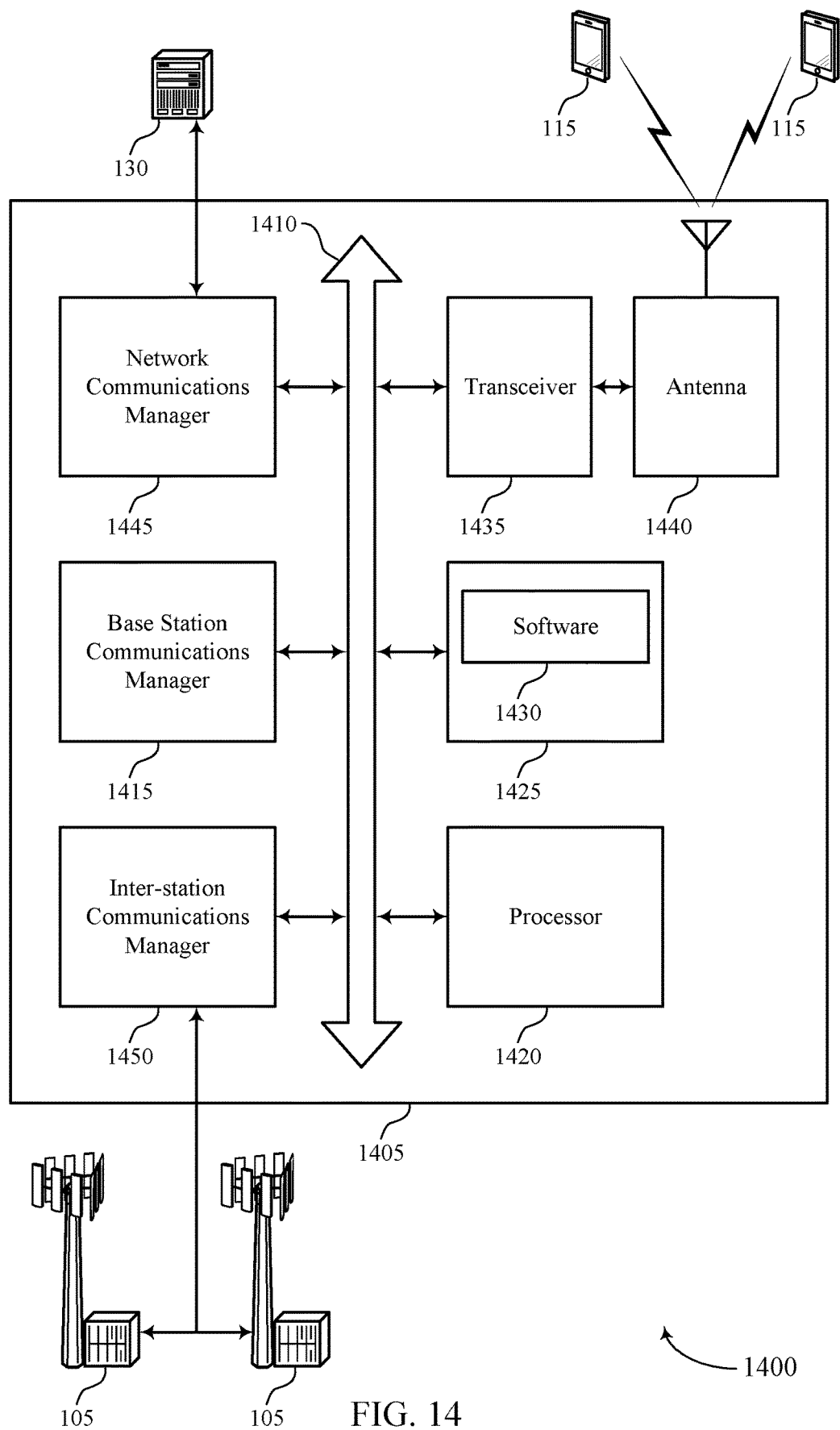
FIG. 14 illustrates a block diagram of a system including a base station that supports polar code construction for low-latency decoding and reduced false alarm rate with multiple formats in accordance with aspects of the present disclosure.

FIG. 14 shows a diagram of a system 1400 including a device 1405 that supports polar code construction for low-latency decoding and reduced false alarm rate with multiple formats in accordance with aspects of the present disclosure.

Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting polar code construction for low-latency decoding and reduced false alarm rate with multiple formats).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support polar code construction for low-latency decoding and reduced false alarm rate with multiple formats. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
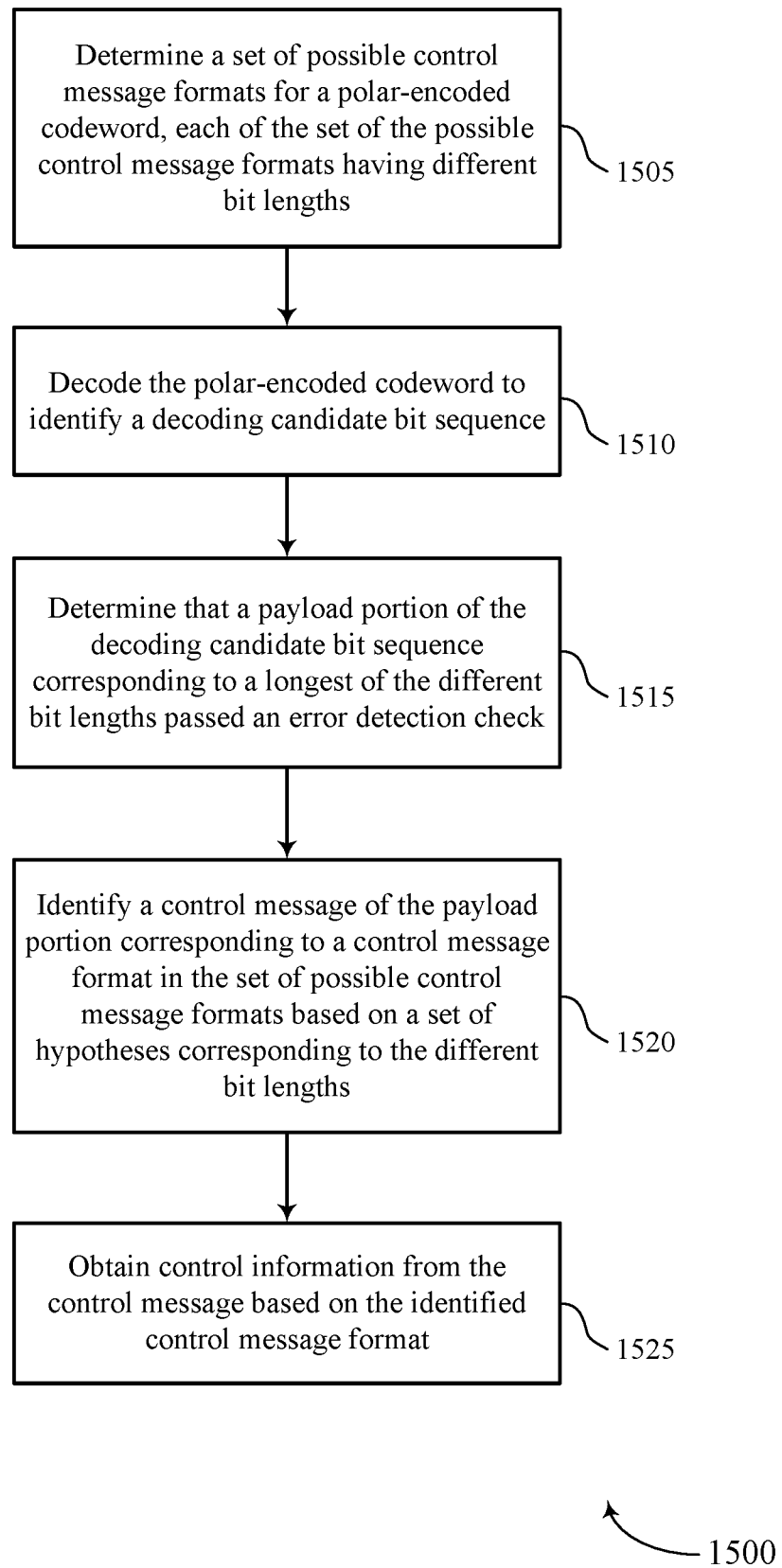
FIGS. 15 through 17 illustrate methods for polar code construction for low-latency decoding and reduced false alarm rate with multiple formats in accordance with aspects of the present disclosure.

FIG. 15 shows a flowchart illustrating a method 1500 for polar code construction for low-latency decoding and reduced false alarm rate with multiple formats in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may determine a set of possible control message formats for a polar-encoded codeword, each of the set of the possible control message formats having different bit lengths. The operations at 1505 may be performed according to the methods described herein. In certain examples, aspects of the operations at 1505 may be performed by a format component as described with reference to FIGS. 7 through 10.

At 1510, the UE 115 may decode the polar-encoded codeword to identify a decoding candidate bit sequence. The operations at 1510 may be performed according to the methods described herein. In certain examples, aspects of the operations at 1510 may be performed by a decoder as described with reference to FIGS. 7 through 10.

At 1515, the UE 115 may determine that a payload portion of the decoding candidate bit sequence corresponding to a longest of the different bit lengths passed an error detection check, by extracting a received error check value from the decoding candidate bit sequence, and comparing the received error check value to a calculated representation of the error check value. The operations at 1515 may performed according to the methods described herein. In certain examples, aspects of the operation at 1515 may be performed by an error detector as described with reference to FIGS. 7 through 10.

At 1520, the UE 115 may identify a control message of the payload portion corresponding to a control message format in the set of possible control message formats based at least in part on a plurality of hypotheses corresponding to the different bit lengths. The operations at 1515 may be performed according to the methods described herein. In certain examples, aspects of the operations at 1515 may be performed by a format component as described with reference to FIGS. 7 through 10.

At 1525, the UE 115 may obtain control information from the control message based at least in part on the control message format. The operations of block 1520 may be performed according to the methods described herein. In certain examples, aspects of the operations of block 1520 may be performed by a length determiner as described with reference to FIGS. 7 through 10.

Figure 16:
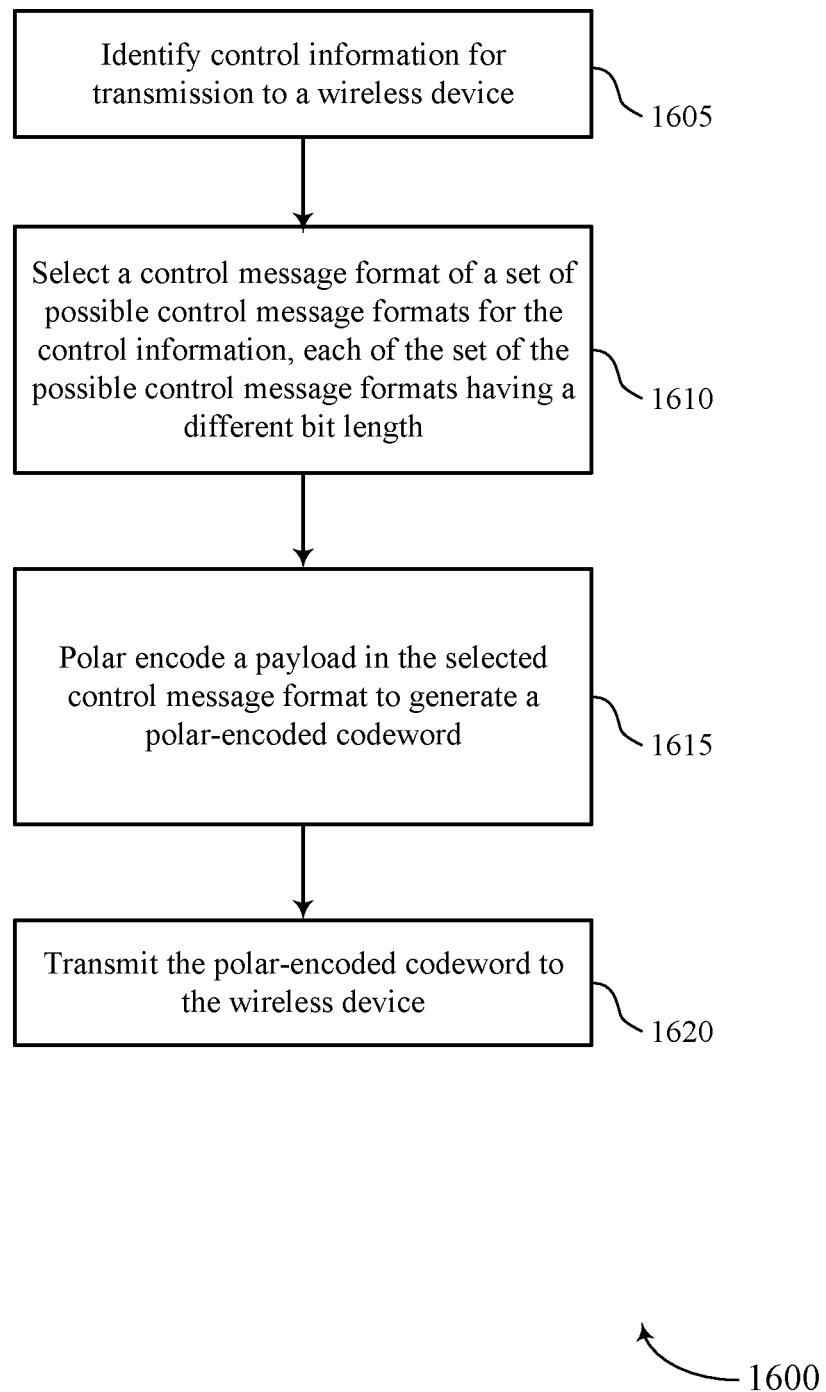

FIG. 16 shows a flowchart illustrating a method 1600 for polar code construction for low-latency decoding and reduced false alarm rate with multiple formats in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may identify control information for transmission to a wireless device. The operations at 1605 may be performed according to the methods described herein. In certain examples, aspects of the operations at 1605 may be performed by a format component as described with reference to FIGS. 11 through 14.

At 1610, the base station 105 may select a control message format of a set of possible control message formats for the control information, each of the set of the possible control message formats having different bit lengths. The operations at 1605 may be performed according to the methods described herein. In certain examples, aspects of the operations at 1605 may be performed by a format component as described with reference to FIGS. 11 through 14.

At 1615, the base station 105 may polar encode a payload and an error check value in the selected control message format to generate a polar-encoded codeword. In some cases, the payload may have a same number of bits for any of the set of possible control message formats. The operations at 1615 may be performed according to the methods described herein. In certain examples, aspects of the operations at 1615 may be performed by a polar encoder as described with reference to FIGS. 11 through 14.

At 1620, the base station 105 may transmit the polar-encoded codeword to the wireless device. The operations at 1620 may be performed according to the methods described herein. In certain examples, aspects of the operations at 1620 may be performed by a polar encoder as described with reference to FIGS. 11 through 14.

Figure 17:
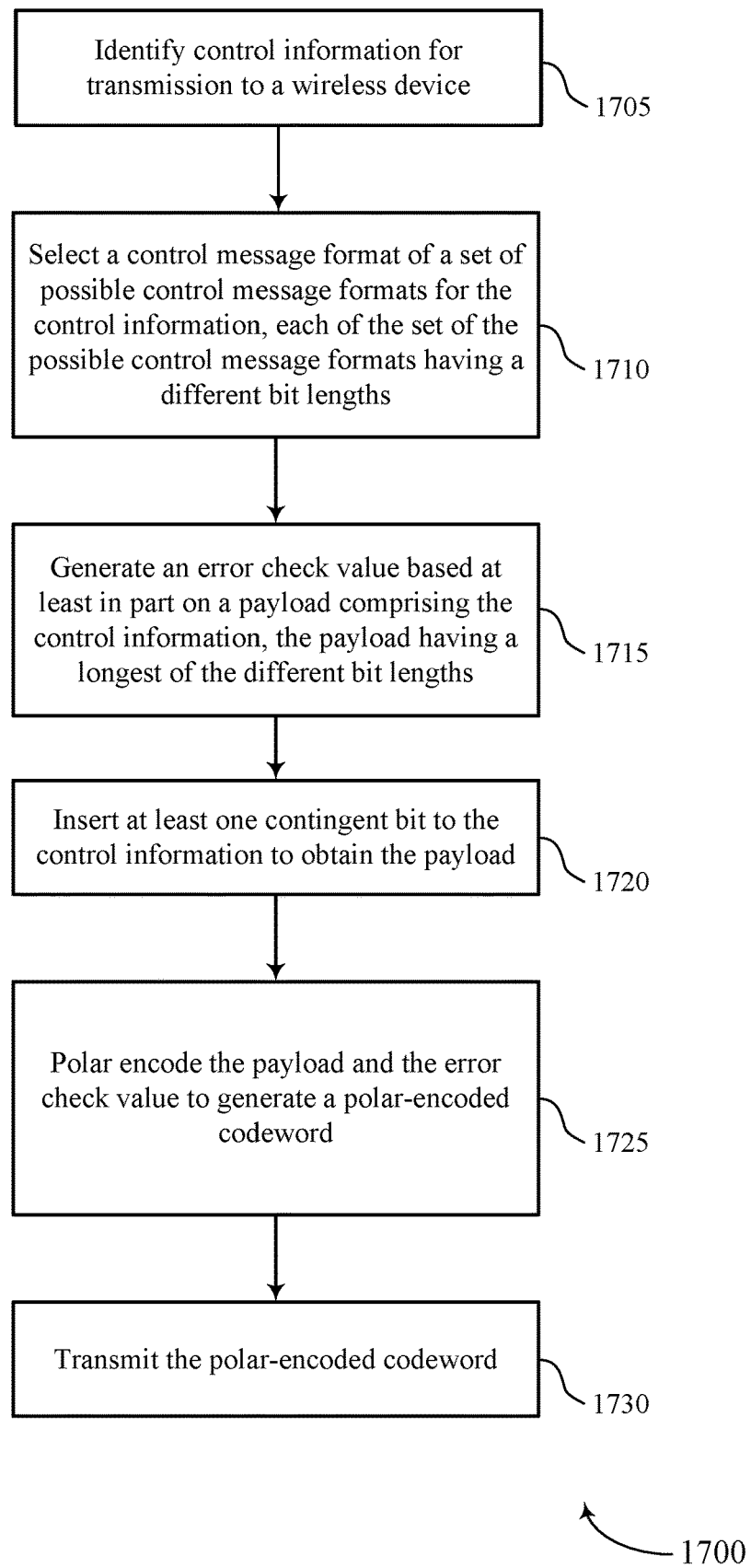

FIG. 17 shows a flowchart illustrating a method 1700 for polar code construction for low-latency decoding and reduced false alarm rate with multiple formats in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may identify control information for transmission to a wireless device. The operations at 1705 may be performed according to the methods described herein. In certain examples, aspects of the operations at 1705 may be performed by a format component as described with reference to FIGS. 11 through 14

At 1710, the base station 105 may select a control message format of a set of possible control message formats for the control information, each of the set of the possible control message formats having different bit lengths. The operations at 1710 may be performed according to the methods described herein. In certain examples, aspects of the operations at 1710 may be performed by a format component as described with reference to FIGS. 11 through 14.

At 1715, the base station 105 may generate an error check value based at least in part on a payload comprising the control information, the payload having a longest of the different bit lengths. The operations at 1715 may be performed according to the methods described herein. In certain examples, aspects of the operations at 1715 may be performed by a bit inserter as described with reference to FIGS. 11 through 14

At 1720, the base station 105 may insert at least one contingent bit to the control information to obtain the payload. The operations at 1720 may be performed according to the methods described herein. In certain examples, aspects of the operations at 1720 may be performed by a bit inserter as described with reference to FIGS. 11 through 14.

At 1725, the base station 105 may polar encode the payload and the error check value to generate a polar-encoded codeword. The operations at 1725 may be performed according to the methods described herein. In certain examples, aspects of the operations at 1725 may be performed by an EDC generator and a polar encoder as described with reference to FIGS. 11 through 14.

At 1730, the base station 105 may transmit the polar-encoded codeword. The operations at 1730 may be performed according to the methods described herein. In certain examples, aspects of the operations at 1730 may be performed by a polar encoder as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining a set of possible control message formats for a polar-encoded codeword, each control message format of the set of possible control message formats having a different bit length;
    decoding the polar-encoded codeword to identify a decoding candidate bit sequence;
    determining that a payload portion of the decoding candidate bit sequence corresponding to a longest of the different bit lengths passes an error detection check;
    after determining that the payload portion of the decoding candidate bit sequence corresponding to the longest of the different bit lengths passes the error detection check, identifying a control message of the payload portion corresponding to a control message format in the set of possible control message formats based at least in part on a plurality of control message format hypotheses corresponding to the different bit lengths; and
    obtaining control information from the control message based at least in part on the control message format.

2. The method of claim 1, wherein identifying the control message comprises:
    determining bit values of at least one contingent bit within the payload portion; and
    selecting a bit length from the different bit lengths for the control message format based at least in part on the bit values of the at least one contingent bit.

3. The method of claim 2, wherein the different bit lengths comprise a first bit length corresponding to the longest of the different bit lengths minus a number of bits of the at least one contingent bit and a second bit length corresponding to the longest of the different bit lengths.

4. The method of claim 3, wherein the control message format corresponds to the first bit length based at least in part on the bit values of the at least one contingent bit being zero.

5. The method of claim 3, wherein the control message format corresponds to the second bit length based at least in part on at least one of the bit values of the at least one contingent bit being non-zero.

6. The method of claim 3, wherein the different bit lengths comprise a third bit length corresponding to the longest of the different bit lengths minus a number of bits of a subset of the at least one contingent bit.

7. The method of claim 6, wherein the control message format corresponds to the third bit length based at least in part on the bit values of the subset of the at least one contingent bit being zero and at least one bit value of the at least one contingent bit being non-zero.

8. The method of claim 3, wherein a first control information format corresponding to the first bit length is associated with a first communication type and a second control information format corresponding to the second bit length is associated with a second communication type.

9. The method of claim 1, further comprising:
    determining a channel size as being one of a plurality of channel sizes; and
    performing de-rate matching on the polar-encoded codeword to generate a de-rate matched codeword, wherein decoding the polar-encoded codeword to identify the decoding candidate bit sequence is based at least in part on the de-rate matched codeword.

10. The method of claim 9, wherein the channel size is a size of a physical broadcast channel.

11. The method of claim 9, wherein a first channel size of the plurality of channel sizes is equal to a bandwidth of a synchronization channel, and a second channel size of the plurality of channel sizes is larger than the bandwidth of the synchronization channel.

12. The method of claim 9, wherein a first channel size of the plurality of channel sizes is equal to a bandwidth of a first control channel, and a second channel size of the plurality of channel sizes is larger than the bandwidth of the first control channel.

13. The method of claim 1, wherein decoding the polar-encoded codeword to identify the decoding candidate bit sequence comprises:
    performing a list decoding algorithm to generate a plurality of decoding candidate bit sequences.

14. The method of claim 1, wherein determining that the payload portion passes the error detection check comprises:
    extracting a received error check value from the decoding candidate bit sequence; and
    comparing the received error check value to a calculated representation of the error check value.

15. An apparatus for wireless communication, comprising:
   a processor;
   memory coupled with the processor; and
   instructions stored in the memory and executable by the processor to cause the apparatus to:
      determine a set of possible control message formats for a polar-encoded codeword, each control message format of the set of possible control message formats having a different bit length;
      decode the polar-encoded codeword to identify a decoding candidate bit sequence;
      determine that a payload portion of the decoding candidate bit sequence corresponding to a longest of the different bit lengths passes an error detection check;
      after determining that the payload portion of the decoding candidate bit sequence corresponding to the longest of the different bit lengths passes the error detection check, identify a control message of the payload portion corresponding to a control message format in the set of possible control message formats based at least in part on a plurality of control message format hypotheses corresponding to the different bit lengths; and
      obtain control information from the control message based at least in part on the control message format.

16. The apparatus of claim 15, wherein the instructions to identify the control message are executable by the processor to cause the apparatus to:
   determine bit values of at least one contingent bit within the payload portion; and
   select a bit length from the different bit lengths for the control message format based at least in part on the bit values of the at least one contingent bit.

17. The apparatus of claim 16, wherein the different bit lengths comprise a first bit length corresponding to the longest of the different bit lengths minus a number of bits of the at least one contingent bit and a second bit length corresponding to the longest of the different bit lengths.

18. The apparatus of claim 17, wherein the control message format corresponds to the first bit length based at least in part on the bit values of the at least one contingent bit being zero.

19. The apparatus of claim 17, wherein the control message format corresponds to the second bit length based at least in part on at least one of the bit values of the at least one contingent bit being non-zero.

20. The apparatus of claim 17, wherein the different bit lengths comprise a third bit length corresponding to the longest of the different bit lengths minus a number of bits of a subset of the at least one contingent bit.

21. The apparatus of claim 20, wherein the control message format corresponds to the third bit length based at least in part on the bit values of the subset of the at least one contingent bit being zero and at least one bit value of the at least one contingent bit being non-zero.

22. The apparatus of claim 17, wherein a first control information format corresponding to the first bit length is associated with a first communication type and a second control information format corresponding to the second bit length is associated with a second communication type.

23. The apparatus of claim 15, wherein the instructions are further executable by the processor to cause the apparatus to:
   determine a channel size as being one of a plurality of channel sizes; and
   perform de-rate matching on the polar-encoded codeword to generate a de-rate matched codeword, wherein decoding the polar-encoded codeword to identify the decoding candidate bit sequence is based at least in part on the de-rate matched codeword.

24. The apparatus of claim 23, wherein the channel size is a size of a physical broadcast channel.

25. The apparatus of claim 23, wherein a first channel size of the plurality of channel sizes is equal to a bandwidth of a synchronization channel, and a second channel size of the plurality of channel sizes is larger than the bandwidth of the synchronization channel.

26. The apparatus of claim 23, wherein a first channel size of the plurality of channel sizes is equal to a bandwidth of a first control channel, and a second channel size of the plurality of channel sizes is larger than the bandwidth of the first control channel.

27. The apparatus of claim 15, wherein the instructions to decode the polar-encoded codeword to identify the decoding candidate bit sequence are executable by the processor to cause the apparatus to:
   perform a list decoding algorithm to generate a plurality of decoding candidate bit sequences.

28. The apparatus of claim 15, wherein the instructions to determine that the payload portion passes the error detection check are executable by the processor to cause the apparatus to:
   extract a received error check value from the decoding candidate bit sequence; and
   compare the received error check value to a calculated representation of the error check value.

29. An apparatus for wireless communication, comprising:
   a processor;
   memory coupled with the processor; and
   instructions stored in the memory and executable by the processor to cause the apparatus to:
      identify control information for transmission to a wireless device;
      select a control message format of a set of possible control message formats for the control information, each of the set of possible control message formats having a different bit length;
      generate an error check value based at least in part on a payload comprising the control information, the payload having a longest of the different bit lengths;
      polar encoding the payload and the error check value to generate a polar-encoded codeword; and
      transmit the polar-encoded codeword to the wireless device.

30. An apparatus for wireless communication, comprising:
   means for determining a set of possible control message formats for a polar-encoded codeword, each control message format of the set of possible control message formats having a different bit length;
   means for decoding the polar-encoded codeword to identify a decoding candidate bit sequence;
   means for determining that a payload portion of the decoding candidate bit sequence corresponding to a longest of the different bit lengths passes an error detection check;
   means for identifying, after determining that the payload portion of the decoding candidate bit sequence corresponding to the longest of the different bit lengths passes the error detection check, a control message of the payload portion corresponding to a control message format in the set of possible control message formats based at least in part on a plurality of control message format hypotheses corresponding to the different bit lengths; and means for obtaining control information from the control message based at least in part on the control message format.

31. A non-transitory computer-readable medium storing code for wireless communication, the code comprising instructions executable by a processor to:

determine a set of possible control message formats for a polar-encoded codeword, each control message format of the set of possible control message formats having a different bit length;

decode the polar-encoded codeword to identify a decoding candidate bit sequence;

determine that a payload portion of the decoding candidate bit sequence corresponding to a longest of the different bit lengths passes an error detection check;

after determine that the payload portion of the decoding candidate bit sequence corresponding to the longest of the different bit lengths passes the error detection check, identify a control message of the payload portion corresponding to a control message format in the set of possible control message formats based at least in part on a plurality of control message format hypotheses corresponding to the different bit lengths; and obtain control information from the control message based at least in part on the control message format.

* * * * *